(12) United States Patent
Shanbhag et al.

(10) Patent No.: US 8,135,858 B2
(45) Date of Patent: Mar. 13, 2012

(54) ISOLATION SWITCH FOR FIBRE CHANNEL FABRICS IN STORAGE AREA NETWORKS

(75) Inventors: Santosh Shanbhag, Saratoga, CA (US); Richard L. Hammons, Hollister, CA (US); Balakumar N. Kaushik, Sunnyvale, CA (US); Vincent W. Guan, Saratoga, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 0 days.

(21) Appl. No.: 13/238,815

(22) Filed: Sep. 21, 2011

(65) Prior Publication Data

US 2012/0011297 A1 Jan. 12, 2012

Related U.S. Application Data

(63) Continuation of application No. 12/987,475, filed on Jan. 10, 2011, now Pat. No. 8,055,794, which is a continuation of application No. 12/722,022, filed on Mar. 11, 2010, now Pat. No. 7,877,512, which is a continuation of application No. 10/767,405, filed on Jan. 29, 2004, now Pat. No. 7,707,309.

(51) Int. Cl.
*G06F 15/173* (2006.01)

(52) U.S. Cl. ........ 709/244; 709/202; 709/227; 709/232; 709/250; 709/253

(58) Field of Classification Search ............ 709/202, 709/227, 232, 244, 250, 253
See application file for complete search history.

(56) References Cited

U.S. PATENT DOCUMENTS

| | | |
|---|---|---|
| 5,363,367 A | 11/1994 | Kobayashi et al. |
| 6,401,128 B1 | 6/2002 | Stai et al. |
| 6,470,007 B1 | 10/2002 | Berman |
| 6,608,819 B1 | 8/2003 | Mitchem et al. |
| 6,763,417 B2 | 7/2004 | Paul et al. |
| 6,941,260 B2 | 9/2005 | Emberty et al. |
| 6,985,490 B2 | 1/2006 | Czeiger et al. |
| 7,068,651 B2 | 6/2006 | Schmidt et al. |
| 7,103,704 B2 | 9/2006 | Chatterjee |
| 7,103,711 B2 | 9/2006 | Valdevit |
| 7,107,347 B1 | 9/2006 | Cohen |
| 7,305,069 B1 | 12/2007 | Day |
| 7,385,982 B2 | 6/2008 | Warden et al. |
| 7,493,416 B2 * | 2/2009 | Pettey ........................ 709/250 |
| 7,512,717 B2 * | 3/2009 | Pettey ........................ 709/250 |
| 7,577,134 B2 | 8/2009 | Gopal Gowda et al. |
| 7,707,309 B2 * | 4/2010 | Shanbhag et al. ............ 709/244 |

(Continued)

OTHER PUBLICATIONS

"Fibre Channel Methodologies for Interconnects (FC-MI) Rev 1.8;" NCITS working draft proposed Technical Report; Sep. 28, 2001.

(Continued)

*Primary Examiner* — Michael Won
(74) *Attorney, Agent, or Firm* — Wong, Cabello, Lutsch, Rutherford & Brucculeri, LLP

(57) ABSTRACT

An isolation switch blade Fibre Channel switch presents F_ports to form a first Fibre Channel fabric and N_ports to a second Fibre Channel fabric to appear as node devices. The isolation switch blade may be used to connect a plurality of blade servers to a Fibre Channel fabric. Fabric events engendered by the insertion or removal of hot-pluggable devices are handled by the isolation switch blade and "event storms" on the Fibre Channel fabric are avoided. The isolation switch blade presents the blade servers to the FC fabric as a virtualized N_port.

24 Claims, 15 Drawing Sheets

U.S. PATENT DOCUMENTS

| | | | |
|---|---|---|---|
| 7,877,512 B2 * | 1/2011 | Shanbhag et al. | 709/244 |
| 8,055,794 B2 * | 11/2011 | Shanbhag et al. | 709/244 |
| 2002/0023184 A1 | 2/2002 | Paul | |
| 2002/0116564 A1 | 8/2002 | Paul et al. | |
| 2002/0161567 A1 | 10/2002 | Emberty et al. | |
| 2002/0191649 A1 | 12/2002 | Woodring | |
| 2003/0012204 A1 | 1/2003 | Czeiger et al. | |
| 2003/0076788 A1 | 4/2003 | Grabauskas et al. | |
| 2003/0118053 A1 | 6/2003 | Edsall et al. | |
| 2003/0189935 A1 | 10/2003 | Warden et al. | |
| 2004/0013092 A1 | 1/2004 | Betker et al. | |
| 2004/0013125 A1 | 1/2004 | Betker et al. | |
| 2004/0024905 A1 | 2/2004 | Liao et al. | |
| 2004/0081186 A1 | 4/2004 | Warren et al. | |
| 2005/0018673 A1 | 1/2005 | Dropps et al. | |
| 2005/0025075 A1 | 2/2005 | Dutt et al. | |
| 2005/0036499 A1 | 2/2005 | Dutt et al. | |
| 2005/0044354 A1 | 2/2005 | Hagerman | |
| 2005/0198523 A1 | 9/2005 | Shanbhag et al. | |
| 2005/0232285 A1 | 10/2005 | Terrell et al. | |
| 2006/0034302 A1 | 2/2006 | Peterson | |
| 2006/0092932 A1 | 5/2006 | Ghosh et al. | |
| 2007/0002883 A1 | 1/2007 | Edsall et al. | |
| 2007/0058619 A1 | 3/2007 | Gopal Gowda et al. | |
| 2007/0091903 A1 | 4/2007 | Atkinson | |
| 2008/0028096 A1 | 1/2008 | Henderson et al. | |
| 2009/0290589 A1 | 11/2009 | Green | |

OTHER PUBLICATIONS

"Fibre Channel Methodologies for Interconnects—2 (FC-MI-2) Rev 2.60;" INCITS working draft proposed Technical Report; Jun. 7, 2005.

American National Standard for Information Technology; "Fibre Channel—Fabric Gneric Requirements (FC-FG)" Secretariat: Information Technology Industry Council; Approved Dec. 4, 1996: American National Standards Institute, Inc.

"Fibre Channel Switch Fabric (FC-SW) Rev 3.3;" NCITS working draft proposed American National Standard for Information Technology; Oct. 21, 1997.

"Fibre Channel Switch Fabric—2 (FC-SW-2) Rev 5.3;" NCITS working draft proposed American National Standard for Information Technology; Jun. 26, 2001 (pp. begin to 32 & 69-94).

"Fibre Channel Fabric—3 (FC-SW-3) Rev 6.6;" NCITS working draft proposed American National Standard for Information Technology; Dec. 16, 2003 (pp. begin to 30 & 91-116).

"Fibre Channel Physical and Signaling Interface (FC-PH) Rev 4.3;" working draft proposed American National Standard for Information Systems; Jun. 1, 1994 (pp. begin to 32).

* cited by examiner

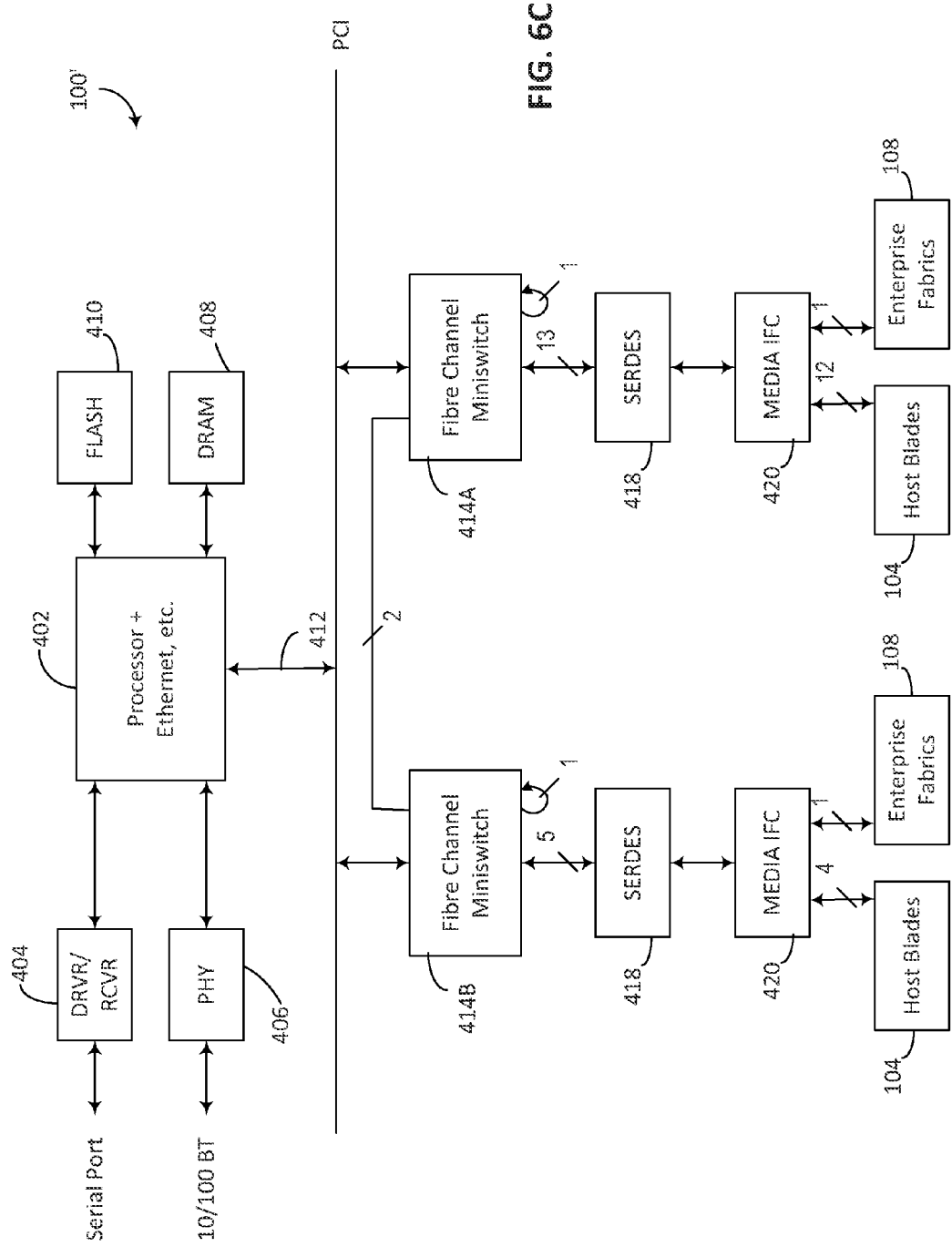

| Proxy Domain | Virtual ingress/egress N-port | Virtual/Proxy N-port address of initiator/target ports | Physical Address of initiator/target ports |
|---|---|---|---|
| PD0 | NPV1 | PID1' | PID1 |
| | | PID2' | PID2 |
| | | ... | ... |
| | | PNP1-A | NP1 |
| | | PNP2-A | NP2 |
| | | ... | ... |
| PD1 | NPV2 | PID1' | PID1 |
| | | PID2' | PID2 |
| | | ... | ... |
| | | PNP1-B | NP1 |
| | | PNP2-B | NP2 |
| | | ... | ... |

Fabric A (rows 1–6), Fabric B (rows 7–12)

FIG. 8

ISOLATION SWITCH FOR FIBRE CHANNEL FABRICS IN STORAGE AREA NETWORKS

CROSS REFERENCE TO RELATED APPLICATIONS

This patent application is a continuation of U.S. patent application Ser. No. 12/987,475, now U.S. Pat. No. 8,055,794, entitled "Isolation Switch for Fibre Channel Fabrics in Storage Area Networks" by Santosh Shanbhag, Richard L. Hammons, Balakumar N. Kaushik, and Vincent W. Guan and filed on Jan. 10, 2011, which is a continuation of U.S. patent application Ser. No. 12/722,022, now U.S. Pat. No. 7,877,512, issued Jan. 25, 2011, entitled "Isolation Switch for Fibre Channel Fabrics in Storage Area Networks" by Santosh Shanbhag, Richard L. Hammons, Balakumar N. Kaushik, and Vincent W. Guan and filed on Mar. 11, 2010, which is a continuation of U.S. patent application Ser. No. 10/767,405, now U.S. Pat. No. 7,707,309, issued Apr. 27,2010, entitled "Isolation Switch for Fibre Channel Fabrics in Storage Area Networks" by Santosh Shanbhag, Richard L. Hammons, Balakumar N. Kaushik, and Vincent W. Guan and filed on Jan. 29, 2004, all of which are hereby incorporated by reference and to which priority is claimed. This patent application is related to U.S. Pat. Nos. 7,577,134, entitled "Port Expander for Fibre Channel Fabrics in Storage Area Networks" by Manjunath A. Gopal Gowda and Richard L. Hammons and 7,760,717, entitled "Interface Switch for Use with Fibre Channel Fabrics in Storage Area Networks" by Michael Atkinson and U.S. patent applications Ser. Nos. 12/500,441, entitled "Port Expander for Fibre Channel Fabrics in Storage Area Networks" by Manjunath A. Gopal Gowda and Richard L. Hammons and filed on Jul. 9, 2009; 12/785,129, entitled "Interface Switch for Use with Fibre Channel Fabrics in Storage Area Networks" by Michael Atkinson and filed on May 21, 2010; and 10/356,392, entitled "Method and Apparatus for Routing between Fibre Channel Fabrics" by Chris Del Signore, Vineet Abraham, Sathish Gnanasekaran, Pranab Patnaik, Vincent W. Guan and Balakumar N. Kaushik.

BACKGROUND OF THE INVENTION

1. Field of the Invention

This invention relates to storage area networking using the Fibre Channel protocol. More particularly, it relates to storage area networks connected to blade-type file servers.

2. Description of the Related Art

The scaling of dynamic Fibre Channel fabrics is a challenging problem. When switches are added to or removed from a fabric they tend to precipitate high volumes of control traffic, causing the CPUs of the constituent switches to get overloaded, and often result in production data disruption due to fabric re-configurations. Fabrics also tend to become unstable while handling large volumes of fabric events. These issues are further exacerbated by the growing trend to blade servers. The host processor blades in the blade servers are intended to be hot-pluggable. Further, any Fibre Channel switch located on a blade would also be intended to be hot-pluggable. This makes fabrics even more dynamic and places increasingly higher scalability requirements on Fibre Channel fabrics. The hot-plug capabilities of these, possibly large, numbers of host and switch blades increases the probability of "event storms," resulting in loading or disrupting the enterprise fabrics they are connected to. These problems may ultimately result in loss of service (e.g., host bus adapter logins may timeout) under heavy load conditions in the fabric. It would be desirable to be able to use host blades and switch blades in blade servers without having the problems discussed above.

SUMMARY OF THE INVENTION

An isolation switch blade according to the present invention presents the façade of a switch to a fabric formed of the host processor blades and that of a host to the enterprise fabric and performs controlled mediation of data and control traffic between the blade fabric and the enterprise fabric. The multiplexing of multiple streams of traffic between the N_ports on the host processor blades and the enterprise fabric is accomplished by a feature in certain Fabric Operating Systems (FOS) called "N_port Virtualization" (NPV). One particular NPV mechanism is described in U.S. patent application Ser. No. 10/356,659 filed Jan. 31, 2003 and entitled "Method and Apparatus for Providing Virtual Ports with Attached Virtual Devices in a Storage Area Network" and in U.S. patent application Ser. No. 10/209,743 filed Jul. 31, 2002 and entitled "Method and Apparatus for Virtualizing Storage Devices inside a Storage Area Network Fabric." Further information is provided in U.S. patent application Ser. No. 10/201,331 filed Jul. 23, 2002 and entitled "Fibre Channel Virtual Host Bus Adapter." The disclosures of these three patent applications are incorporated herein by reference. Using the NPV mechanism, the number of host processor blades that can simultaneously be plugged in, and to which virtual N_port identifiers can be assigned, is 255 (using a one-byte port id), which is a sufficiently large number to accommodate the number of blades in present day blade server chassis.

An isolation switch blade according to the present invention can be connected to multiple enterprise fabrics, so the N_port identifiers within the enterprise fabrics may be mapped to proxy addresses that are scoped by the fabric. All control traffic address mappings between virtual and physical addresses may be mediated and translated by the CPU of the isolation switch blade and address mappings for data traffic performed at wire speed.

The use of N_port virtualization also enables the isolation switch blade to act as an initiator, which is advantageous as this allows partitioning of fabrics and isolation of the enterprise fabric from exchanges originating from the host processor blades. Since the host processor blades are not directly connected to the enterprise fabric, the enterprise fabric is isolated from large amounts of fabric activity due to host processor blades being swapped in and out. This isolation promotes scalability within the enterprise fabric. Since the isolation switch blade may preferably be a single conduit into the enterprise fabric, it is also a good point to enforce perimeter defenses (similar to a firewall) against attacks, either intentional or resulting from misbehaviors. The isolation switch blade may also act as a throttle by controlling the host processor blade access into the enterprise fabric. Further, the isolation switch blade may act as a protocol gateway. In addition, the use of the N_port connection increases interoperability, as compared to using an E_port connection.

BRIEF DESCRIPTION OF THE DRAWINGS

FIGS. 6B and 6C are blocks of exemplary isolation switch blades according to the present invention.

FIG. 8 is an exemplary PID mapping table according to the present invention.

DETAILED DESCRIPTION

Figure 1:
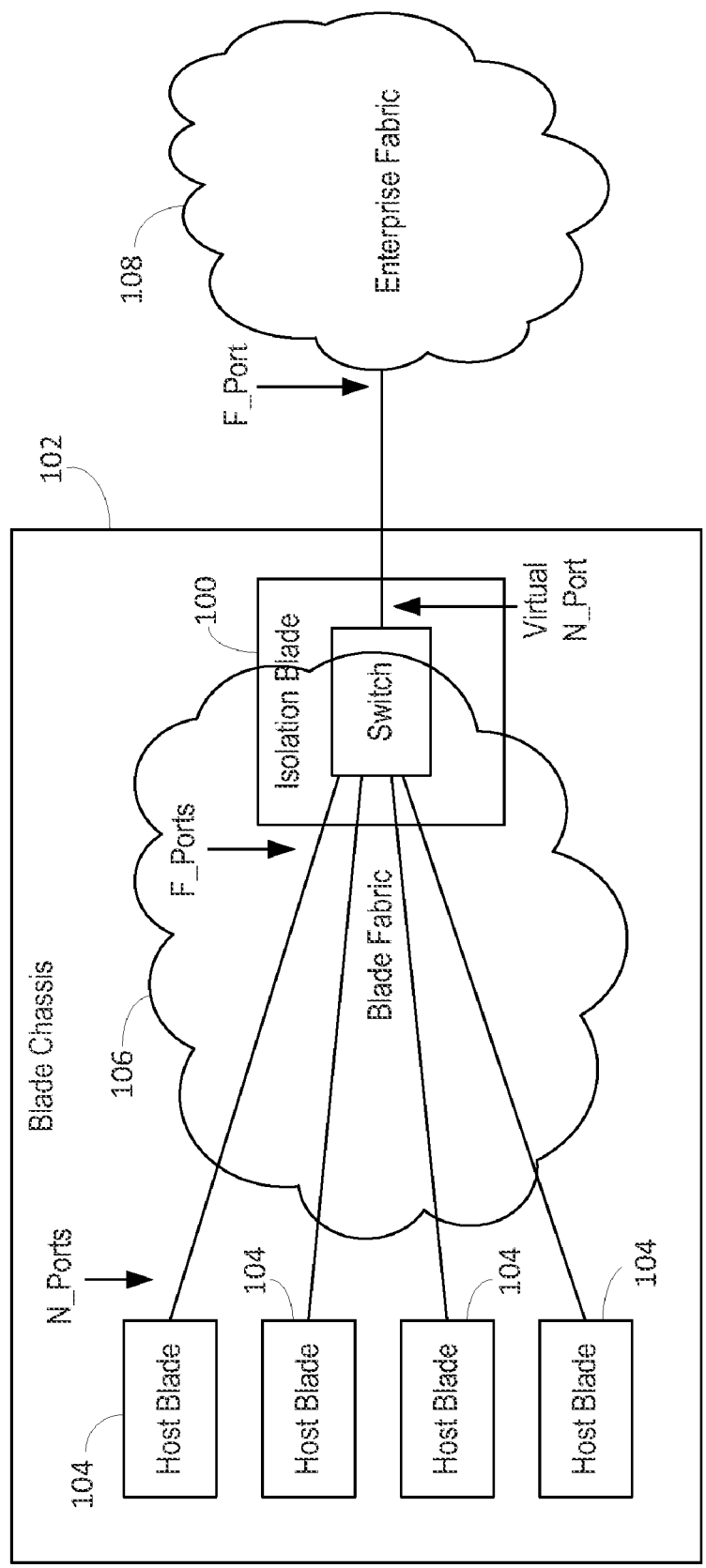
FIG. 1 is a schematic representation of an isolation switch blade in logical communication with four host blades and an enterprise fabric according to the present invention.

Many organizations have begun consolidating their file servers into centralized data centers, looking to use physical, application or data consolidation as a means of reducing the challenges and costs associated with administering many small file servers scattered across the enterprise. To date, physical consolidation has generally involved replacing bulky tower servers with slender 1U or 2U rack systems. Such rack systems take less space and put the servers and infrastructure within easy reach of the network administrator, rather than spread across a large area.

These servers enable organizations to reap many benefits of consolidation, yet because each server requires its own infrastructure—including, e.g., cables for power, Ethernet, systems management, power distribution units (PDUs), keyboard/video/mouse (KVM) switches and Fibre Channel switches—they present challenges of their own. A rack of 1U servers can have hundreds of cables strung throughout the rack, making it difficult to determine which cables attach where and complicating the addition and removal of servers to and from the rack. In addition, the PDUs and switches consume valuable rack sidewall space. A blade server eliminates many of these complications, thus providing an effective alternative to 1U and 2U servers.

The term "blade server" refers to a rack-optimized server that can hold a number of hot-swappable devices called blades. There is a range of blade server designs—from ultradense, low-voltage, lesser-performing servers to high-performance, lower density servers to proprietary, customized rack solutions that include some blade features.

An isolation switch blade (ISB) according to the present invention may be a Fibre Channel (FC) switch in the blade form factor that is housed in a chassis that may include Ethernet switch modules, Fibre Channel switch modules, KVM management modules, power supply modules, a midplane and host blades (all not shown). An example of such a device is the IBM eServer BladeCenter. In addition to providing FC switching capabilities, the isolation switch blade may also incorporate advanced capabilities for providing failure and security isolation, and can facilitate enterprise fabric scaling. Another benefit of the isolation switch blade is that it can be interoperable with a variety of switches since it can connect to the fabric as an N_port rather than as an E_port in the preferred embodiment.

This disclosure describes the architecture of an isolation switch blade according to the present invention. The role of an isolation switch blade is to enable Fibre Channel fabrics to behave well when blade servers are connected to them. Fibre Channel fabrics comprise one or more Fibre Channel switches connected in some networked topology.

Blade servers introduce a level of service distribution (distribution of applications across blades to scale out) that is not as common in current 'monolithic' servers, which are typically configured to run an enterprise application running on a single server. Furthermore, misbehaving host bus adapters (HBAs) might induce control traffic, e.g. repeatedly doing FLOGIs (fabric logins, a process by which a node makes a logical connection to a fabric switch) and, with the introduction of a large number of blades, the probability of such misbehavior increases. As a result, there is a greater likelihood of a larger number of data and control traffic exchanges being initiated from multiple sources and it is critical to insulate the fabric from misbehaviors and/or malicious attacks.

An isolation switch blade is similar to a conventional switch blade in that it presents standard F_ports (fabric ports to which N_ports attach) to the host blades, but different in that it connects to the enterprise fabric as N_ports (rather than as E_ports) in the preferred embodiment. The isolation switch blade partitions the enterprise storage area network (SAN) into two separate fabrics such that the blade server is connected to the "blade fabric" and other servers and devices are connected to the "enterprise fabric." FIG. 1 shows a possible deployment of the isolation switch blade in a blade chassis 102 with a series of host blades 104 which illustrates how two distinct logical fabrics, the blade fabric 106 and the enterprise fabric 108, are being constructed. The purpose of the blade fabric 106 is to isolate the enterprise fabric 108 and provide controlled access to it from host blades 104.

The isolation switch blade 100 replicates some of the functionality of a Fibre Channel fabric bridge. However the isolation switch blade 100 is quite different from, and consequently simpler than, a fabric bridge.

Figure 2:
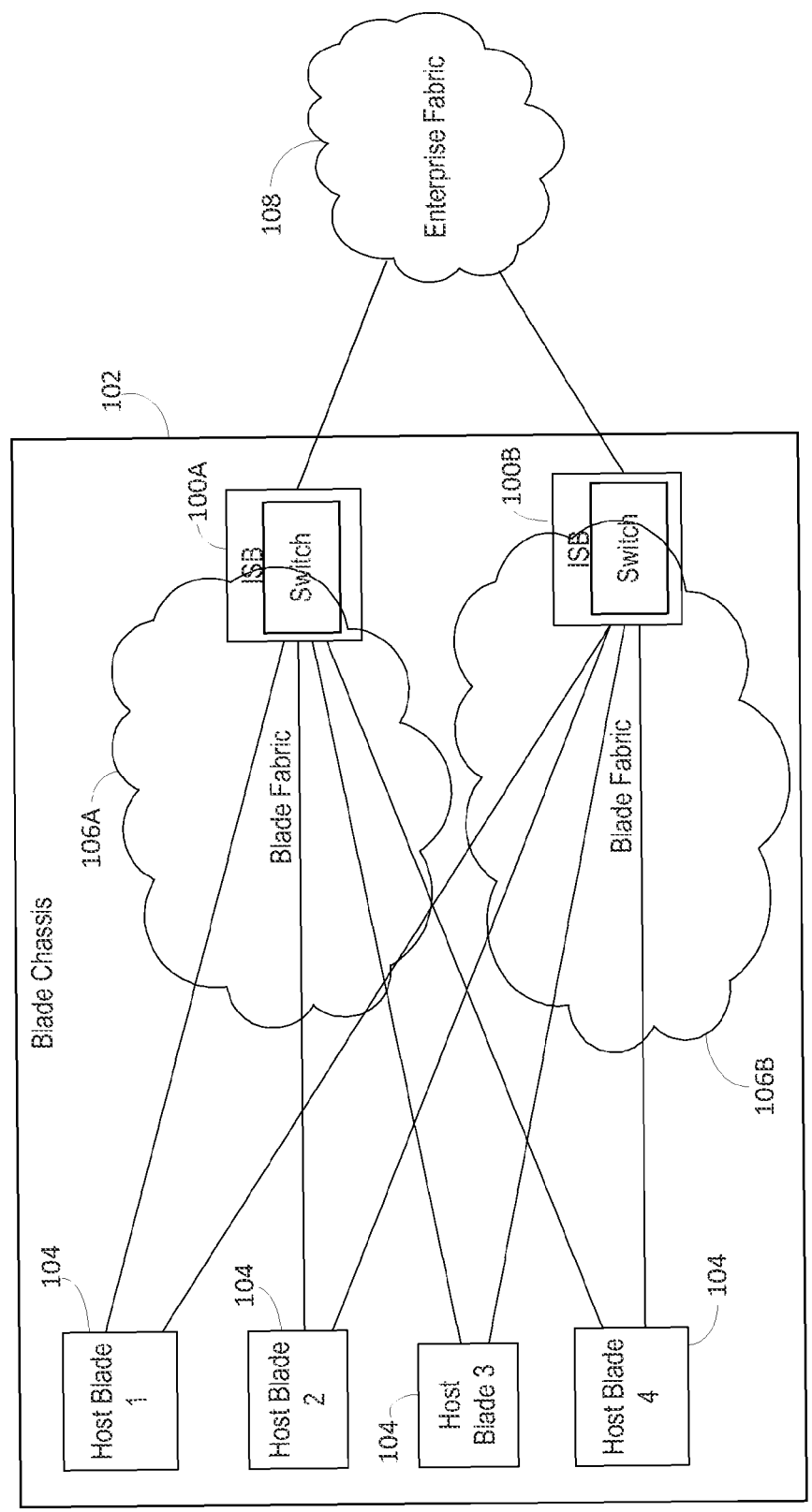
FIG. 2 is a schematic representation of a system in which four host blades are connected to a pair of isolation switch blades according to the present invention.

As illustrated in FIG. 2, one may dual-connect each host blade 104 to multiple isolation switch blades 100A, 100B in order to eliminate a single point of failure. This dual-connect is conventional in existing SANs and the isolation switch blade allows such a configuration to be maintained.

Fabric scalability is about ensuring that the Fabric OS can reasonably handle the peak load conditions induced by ever-larger fabrics during periods of intense demand and activity. Such peak loads generally involve fabric-wide events that affect many of the Fabric OS components. Fabric reconfiguration takes place with the introduction and removal of switches into the fabric. The reconfiguration process involves computation-intensive activities such as rebuilding of fabrics, re-computation of routes, etc. With the introduction of bladed servers and switches, fabrics are expected to become increasingly more dynamic, resulting in an increase in the rate at which these fabric-wide events and fabric reconfigurations occur. Hence, the scalability issues may be further exacerbated.

When an embedded switch in a blade server chassis joins the fabric, the introduction of the embedded switch typically requires a domain id assignment, routes to be recomputed, zone merges to be done and so on. Since the key capability provided by blade servers is the ability to scale out and provide modularity, the plugging in and out of blades may be a norm rather than an exception and these fabric reconfigurations are more likely to take place more frequently.

When a number of blade servers attempt to FLOGI to an embedded switch's F_port, a large number of updates to the switch's login database may be triggered. A Fibre Channel Protocol (FCP) daemon in the Fabric OS may start probing the N_ports and send "update area" messages to the name server. A large number of probes and name server updates may be triggered, followed by the name server sending Registered State Change Notifications (RSCNs), a switch function that allows notification to registered nodes if a change occurs in the fabric. Similarly, a blade being removed from the chassis may trigger updates to the switch login database and name server database and may cause more RSCNs to be sent out to registered devices. A large amount of such internal fabric activity results in a large amount of processing burden on switch CPUs and this may result in device-initiated exchanges timing out, resulting in devices not being able to receive proper service.

Aspects of the present invention involve isolating blade servers from the enterprise fabric via the isolation switch blade 100. This provides a high level of isolation between the host blades 104 and the enterprise fabric 108. Scalability is enhanced due to isolation provided by the isolation switch blades 100 to enterprise fabrics 108 such that the enterprise fabric 108 is not directly impacted when host blades 104 are swapped in and out of the blade fabric 106 and can hence provide a more controlled environment to the enterprise fabric 108.

Connecting as an N_port using the NPV mechanism enables the isolation switch blade 100 to be connected to non-proprietary enterprise fabrics 108 and does not have potential interoperability issues of proprietary E_port implementations.

Figure 3:
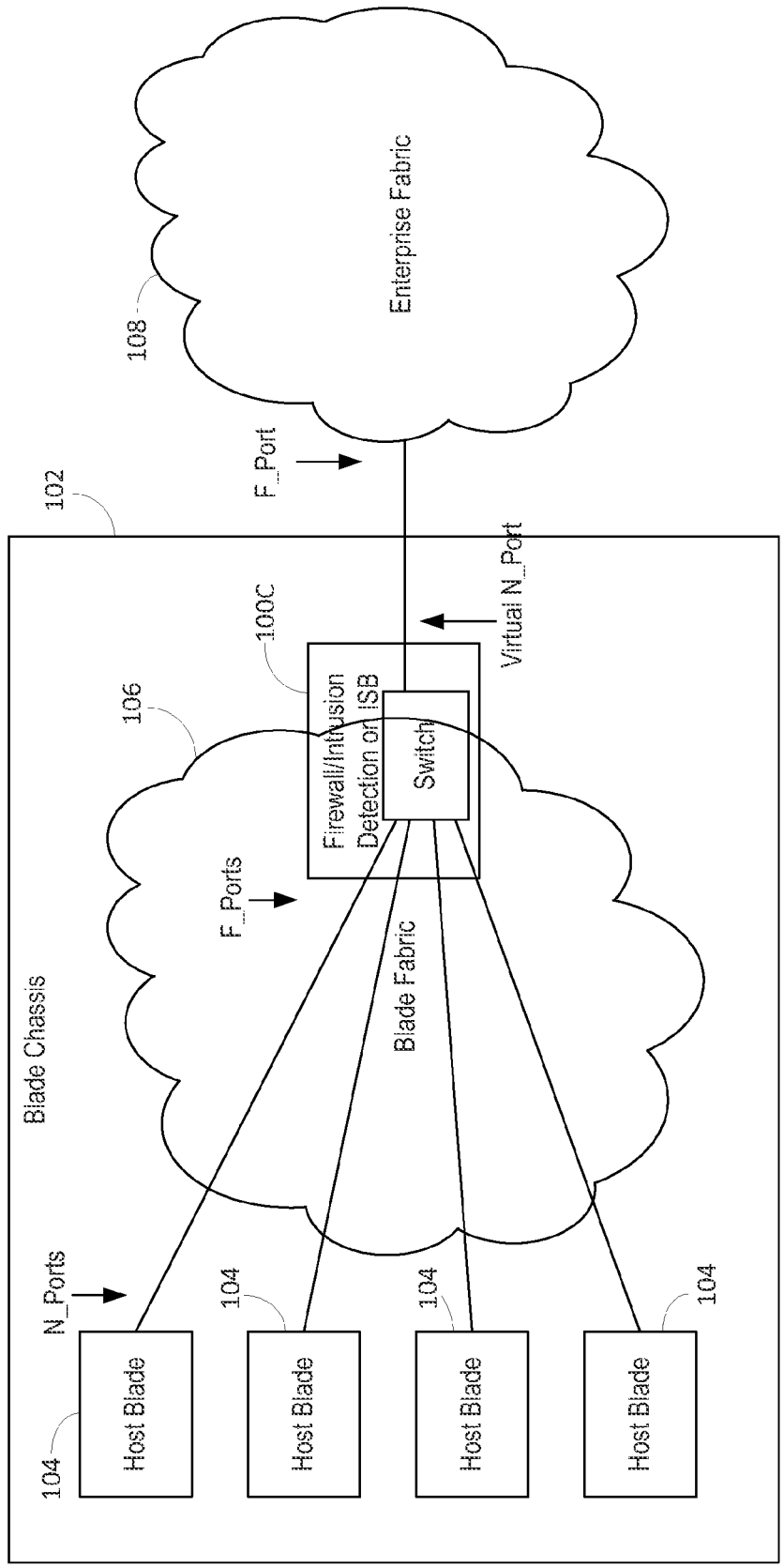
FIG. 3 is a schematic representation of a Fibre Channel enterprise fabric in logical communication with a firewall/intrusion detector in an isolation switch blade according to the present invention.

Since the isolation switch blade 100 places itself in the control path of any traffic that originates on the host blades 104 and may be intended for the enterprise fabric 108, the isolation switch blade 100 is a viable base for hosting software that can perform port and Logical Unit Number (LUN) filtering, zoning enforcement, stateful inspection, checking for malformed packets, probing for buffer overflows in the FOS copies in the blade center fabric, and performing overall in-band intrusion detection. In other words, the isolation switch blade 100 can fulfill a secondary purpose of providing enhanced security at the perimeter of the enterprise fabric 108 by acting in the role of a "firewall" by selectively filtering out frames that match certain criteria of deviant behavior. FIG. 3 shows one such implementation in schematic form wherein a firewall/intrusion detection system is hosted on isolation switch blade 100C.

With this location, the isolation switch blade 100 may also act as a protocol gateway, such as iSCSI to FCP and so on.

Figure 4:
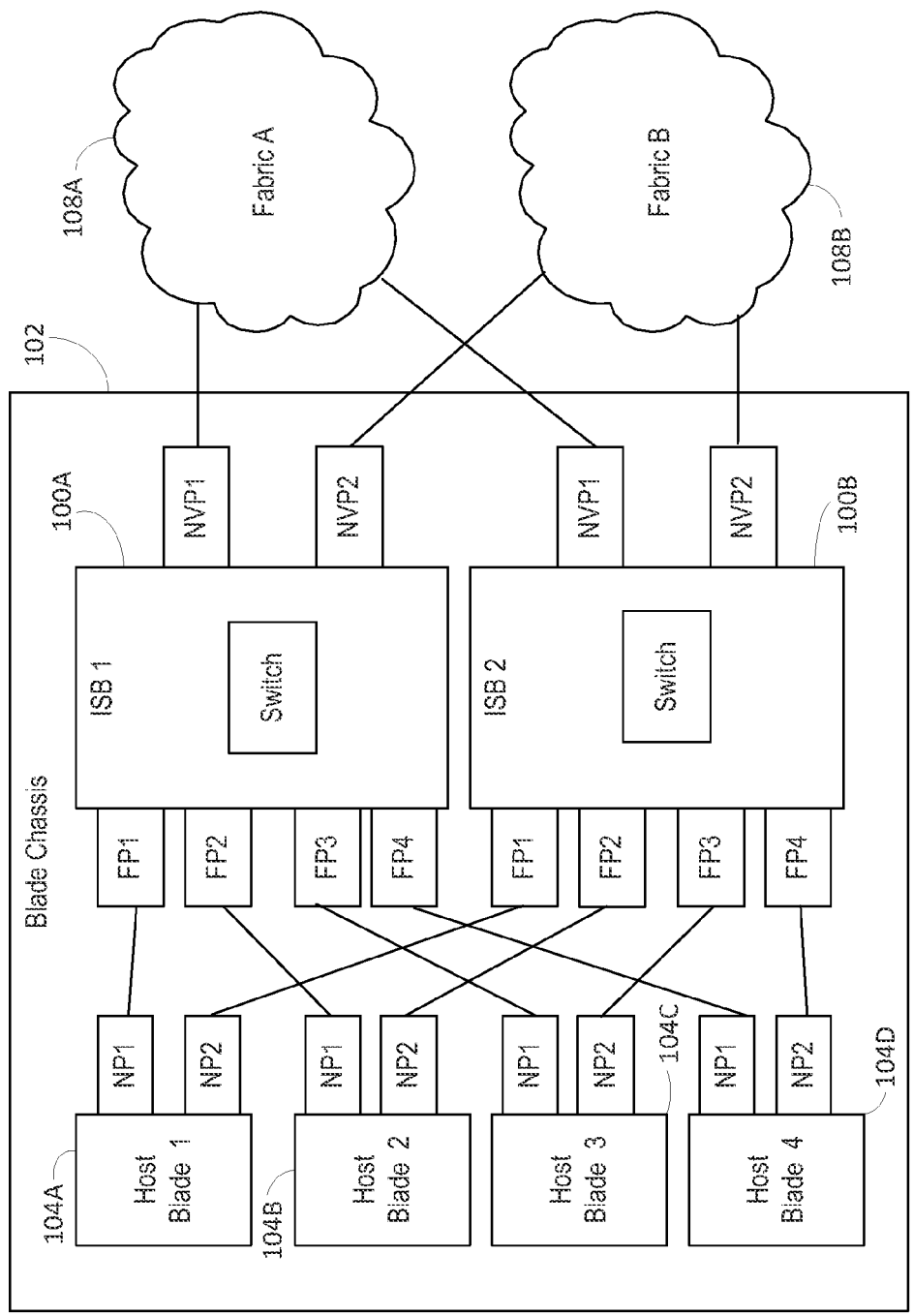
FIG. 4 is a schematic representation of a dual connected host-target configuration according to the present invention.

FIG. 4 depicts a typical deployment architecture with a pair of isolation switch blades (ISB 1 100A and ISB 2 100B) providing dual connectivity for four host blades (host blade 1 to host blade 4 104A to 104D) to two fabrics (A 108A and B 108B). This configuration can be similarly extended to any number of host blades, isolation switch blades or enterprise fabrics. For a 16 port isolation switch blade connected to two fabrics with dual connectivity, up to 14 host blades may be connected to the isolation switch blade.

Figure 5:
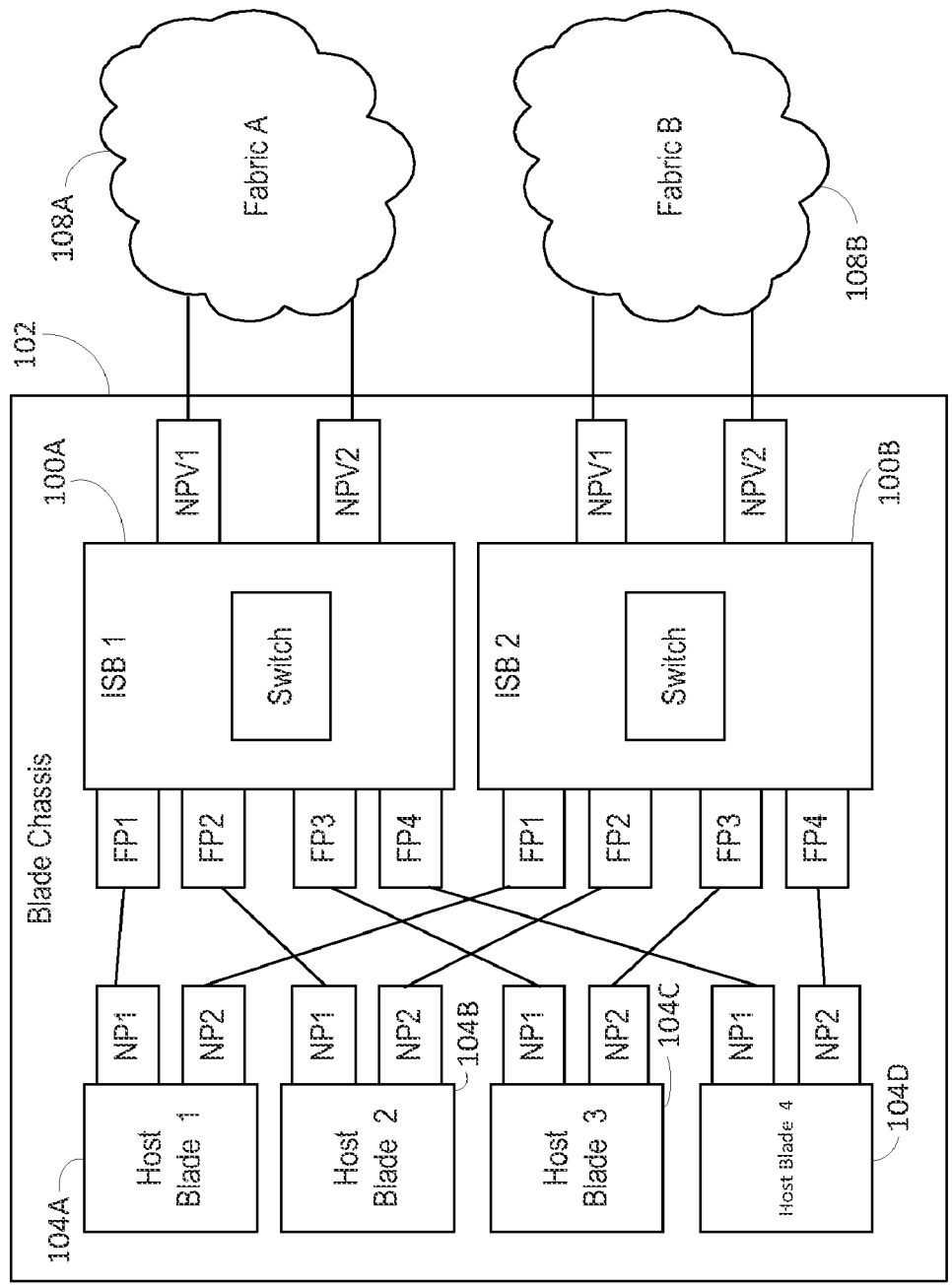
FIG. 5 is a schematic representation of an isolation switch blade with path fail over according to the present invention.

The isolation switch blade 100 may be designed to provide path fail-over capability. FIG. 5 shows an isolation switch blade configuration with path fail over. If one path to a fabric 108A or 108B is lost due to a link going down between the isolation switch blade 100A or 100B and the fabric 108A, 108B, the isolation switch blade 100A, 100B may automatically switch the outgoing traffic to the other port and fill the appropriate SID on the frames, as long as this port is zoned to the target, if it is port zoned, based on which port the frames are sent through.

A simplified architecture makes certain assumptions regarding the behavior of host blade host bus adapters. The assumptions are: a) the host blades 104 can handle or respond to RSCNs when notified about changes to devices connected to the enterprise fabric 108; and, b) in the case where servers are connected to the same enterprise fabric 108 across multiple isolation switch blades 100, it is assumed that the servers have the ability to handle multi-pathing for load balancing or fail over appropriately. In a more complex architecture the isolation switch blade can handle these functions if needed.

Figure 6A:
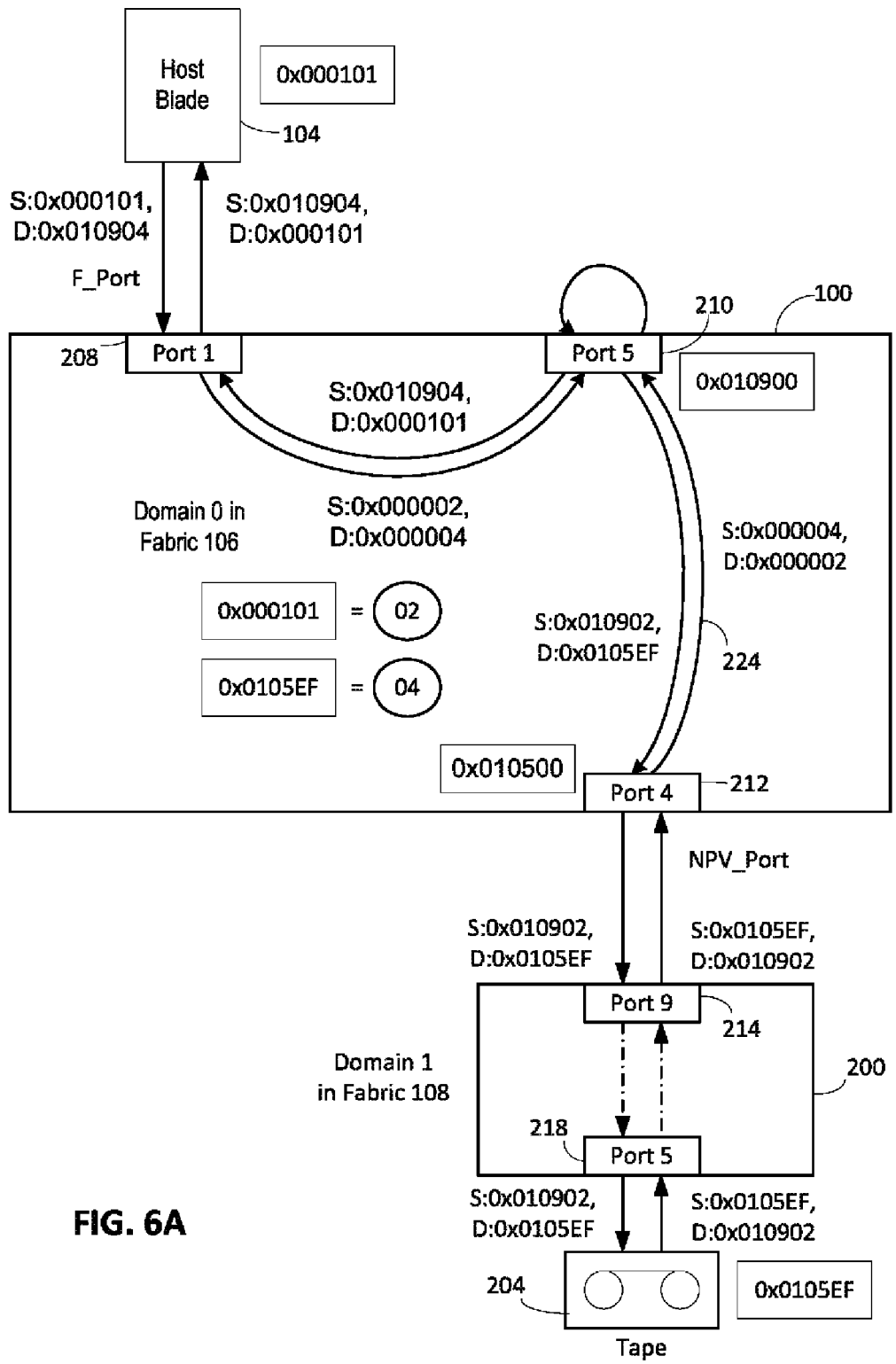
FIG. 6A is a representation of frame flow from a host blade to a target in the enterprise fabric according to the present invention.

A detailed example of the transfer of frames using an isolation switch blade is shown in FIG. 6A. The isolation switch blade 100 is connected to a switch 200, which is representative of the enterprise fabric 108, and to a host blade 104. In the illustrated example, port 1 208 of the isolation switch blade 100 is connected to the host blade 104. The port 1 208 is configured in F_port mode. Similarly, port 4 212 of the isolation switch blade 100 is connected to a port 9 214 of switch 200, a switch in the enterprise fabric 108. The port 4 212 is configured in NPV_port mode, while the port 9 214 is configured in F_port mode. A tape drive unit 204 is connected to port 5 218 of switch 200. It is presumed that the switch 200 is domain 1 in fabric 108, and the isolation switch blade 100 is domain 0 in blade fabric 106.

Port 4 212 is connected by a private intraswitch link 224 to port 5 210. Port 5 210 is connected to port 1 208 by a private intraswitch link 225. Port 5 210 is configured in loopback mode. This is done because in the preferred embodiment public and private translations are only performed on the external receiver portion of a port, so an intervening port is needed to perform address translation. In alternate embodiments each port can do the necessary address translations and this intermediate port is not needed. The host blade 104 and the tape unit 204 have phantom addresses on the private links 224 and 225. In the illustrated embodiment, the address 04 is provided to the tape unit 204 and the address 02 is provided for the host blade 104. Thus private to public translations occur at port 5 210 and public to private translations occur at port 1 208 and port 4 212. For more detail on performing these translations, please refer to U.S. Pat. No. 6,401,128 entitled "System and Method for Sending and Receiving Frames Between a Public Device and a Private Device," which is hereby incorporated by reference.

In the illustrated embodiment the tape unit 204 receives private address 04 and the host blade 104 receives private address 02. Port 5 210 is assigned an address 010900, while port 4 212 is assigned an address of 010500. Thus the host blade 104 will address the tape drive 204 by providing a destination address of 010904 that is a full public address. This address of 010904 is converted by port 1 208 to a private address of 04. This private address of 04 in turn is translated by port 5 210 to an address of 0105EF, which is the actual address of the tape unit 204 in fabric 108. The source address of the host blade 104 is 000101 and is converted to 02 by port 1 208 and then to 010902 by port 5 210. For the tape unit 204 to address the host blade 104, a destination address of 010902 is used. This address of 010902 is converted by port 4 212 into a private address of 02. Packets transmitted from port 5 210 to the port 1 208 are then converted from this private address of 02 to the desired address of 000101 for the host blade 104 by port 5 210. Similarly, port 4 212 converts the tape unit 204 source address of 0105EF to 04 and port 5 210 converts this address to 010904.

If public to private address translation as described above is not available, other suitable address translation techniques which allow full wire speed operation may be used.

Figure 6B:
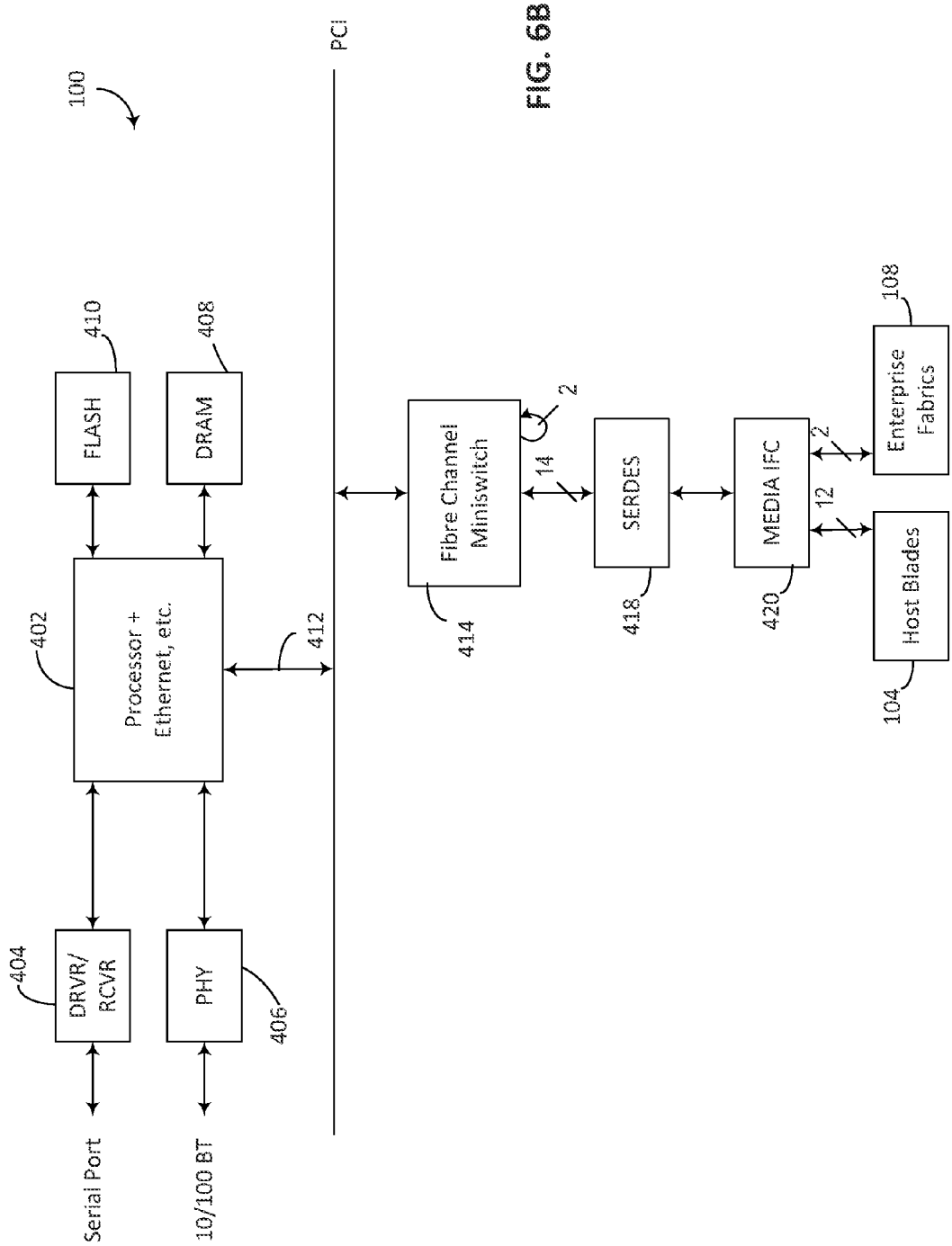

FIG. 6B illustrates a block diagram of an isolation switch blade 100 according to the preferred embodiment. In switch 100 a processor unit 402 that includes a high performance CPU, preferably a PowerPC, and various other peripheral devices including an Ethernet module, is present. Receiver/driver circuitry 440 for a serial port is connected to the processor unit 402, as is a PHY 406 used for an Ethernet connection. A flash memory 410 is connected to the processor 402 to provide permanent memory for the operating system and other routines of the interfabric switch 120, with DRAM 408 also connected to the processor 402 to provide the main memory utilized in the isolation switch blade 100. A PCI bus 412 is provided by the processor 402 and to it is connected a Fabric Channel miniswitch 414. The Fibre Channel miniswitch 414 is preferably developed as shown in U.S. patent application Ser. No. 10/123,996, entitled, "Fibre Channel Zoning By Device Name In Hardware," by Ding-Long Wu, David C. Banks, and Jieming Zhu, filed on Apr. 17, 2002 which is hereby incorporated by reference. This application also describes a hardware filtering mechanism that can be used for filtering, zoning, malformed packet detection, intrusion detection and other aspects of the isolation switch blade 100C. The miniswitch 414 is thus effectively a 16 port switch. Fourteen ports of the miniswitch 414 are connected to a series of serializers 418, which are then connected to media unit 420. Twelve of the media units 420 are for connection to host blades 104 and two media units 420 are for connections to enterprise fabric or fabrics 108. Two of the ports of the miniswitch 414 are configured in loopback mode such as in port 5 210 in FIG. 6A. There are two loopbacks in this embodiment to match the number of enterprise fabric ports. In the preferred embodiment, if two separate enterprise fabrics 108 are connected to the isolation switch blade 100, for example as shown in FIG. 4, an additional loopback port may be needed to provide an additional address translation for one of the fabrics should the connected domains of the enterprise fabrics be the same. This case would reduce the number of available host blade connections to eleven.

FIG. 6C is an embodiment of an isolation switch blade 100' with a larger number of connections for host blades 104. In this embodiment there are two miniswitches 414A and 414B. Miniswitch 414B is preferably an eight port device. In this embodiment two ports of miniswitch 414A are connected to two ports of miniswitch 414B. Each miniswitch 414A and 414B has only one port configured in loopback mode. Each miniswitch 414A, 414B is configured to have one enterprise fabric connection, with the remainder available for host blades, so that the embodiment provides connections for up to 16 host blades 104. In this embodiment preferably the two interswitch links would be configured as private links to minimize the number of hops from an enterprise fabric to a host blade. Thus, if the host blade and the enterprise fabric were connected to the same miniswitch, the loopback port for that miniswitch would be used for address translation. However, if the enterprise fabric and host blade were connected to different miniswitches, the ports of the interswitch link would handle the address translation. In the case described above where the connected domains of the enterprise fabrics are the same, the interswitch links would handle the additionally needed address translation so no additional loopback ports would be needed.

Figure 6D:
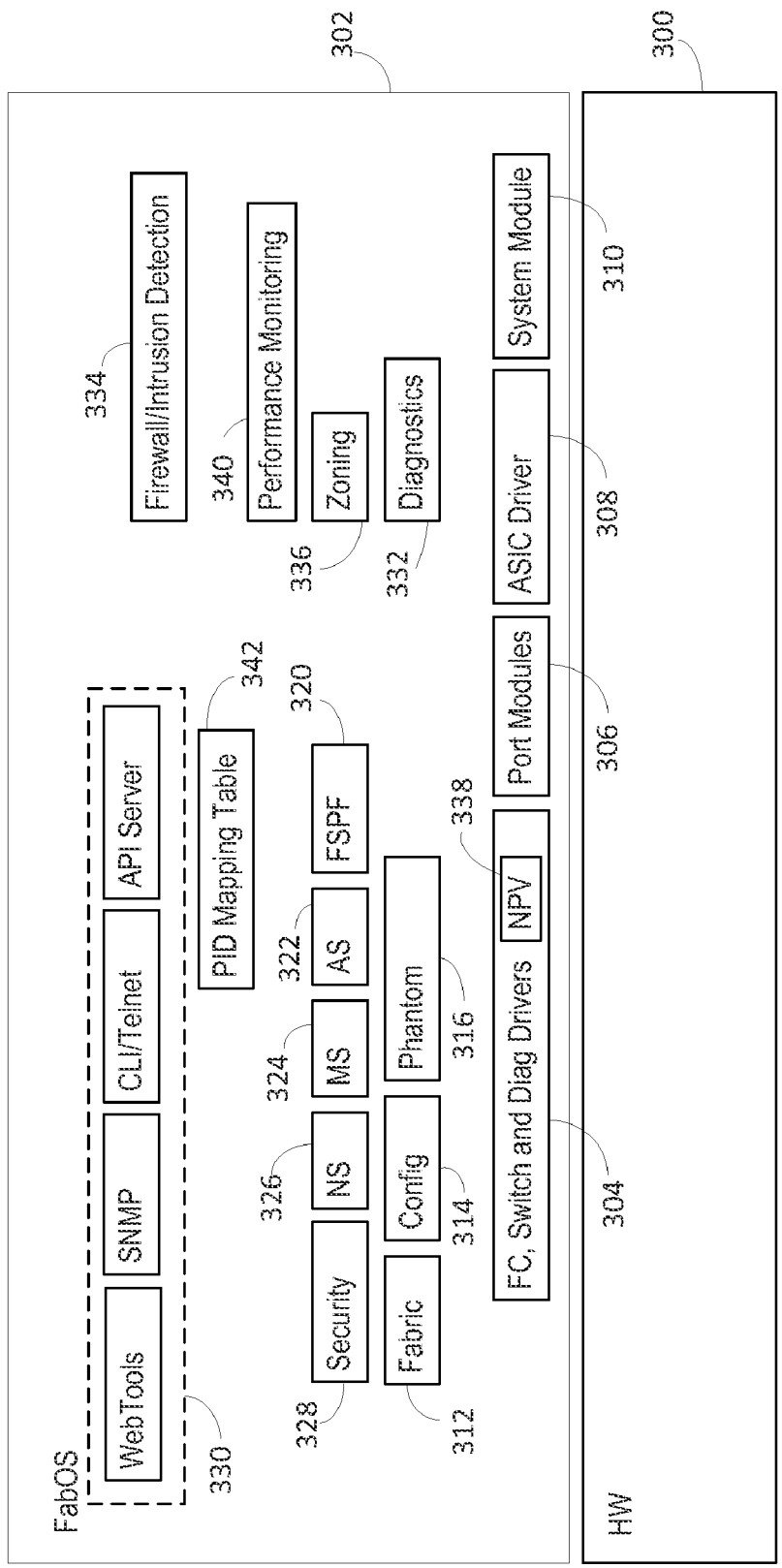
FIG. 6D is an illustration of the software modules in an isolation switch blade according to the present invention.

Proceeding then to FIG. 6D, a general block diagram of the isolation switch blade 100 hardware and software is shown. Block 300 indicates the hardware as previously described. Block 302 is the basic software architecture of the virtualizing switch. Generally think of this as the isolation switch blade fabric operating system and all of the particular modules or drivers that are operating within that embodiment. Modules operating on the operating system 302 are Fibre Channel, switch and diagnostic drivers 304; port modules 306, if appropriate; a driver 308 to work with the Fibre Channel miniswitch ASIC; and a system module 310. Other switch modules include a fabric module 312, a configuration module 314, a phantom module 316 to handle private-public address translations, an FSPF or Fibre Shortest Path First routing module 320, an AS or alias server module 322, an MS or management server module 324, a name server module 326 and a security module 328. Additionally, the normal switch management interface 330 is shown including web server, SNMP, telnet and API modules.

Three additional modules are present according to the present invention. A firewall/intrusion detection module 334 performs those features as described. A PID mapping table 342 is present and accessible by any of the modules as needed. Finally, a virtual node port module 338 performs the node port virtualization function. This module 338 is included in the drivers 304 in the preferred embodiment.

The link initialization protocol between a host blade 104 and the isolation switch blade 100 and between the isolation switch blade 100 and enterprise fabrics 108 is the same as that of a normal F_port as described in the FC-PH and FC-FS standards. Once link initialization is complete, the N_port or virtual N_port and F_port are in the active state. The link initialization between the host blade 104 and isolation switch blade 100 and between the isolation switch blade 100 and the F_ports of the enterprise fabrics 108 can happen independently of each other.

The introduction of the first host blade 104 into the blade chassis 102 causes an FLOGI into the isolation switch blade 100. This results in the isolation switch blade 100 performing a FLOGI into the enterprise fabric 108 and subsequently performing FDISC requests into the enterprise fabric 108 for each host blade 104 that is in the blade chassis 102 to get virtual port id (PID) assignments for the host blades 104. This process is described more completely in U.S. patent application Ser. No. 10/291,331 incorporated by reference above. Within the blade center fabric 108, the isolation switch blade 100 receives a domain id (though in most cases the isolation switch blade 100 would generally be the single and thus principal switch in the blade fabric), after which time the host blades 104 can login to the blade fabric 106.

After link initialization is complete, the blade server's N_port sends its first FLOGI to the isolation switch blade's F_port in the blade center fabric 106. At some point after the isolation switch blade 100 has done an FLOGI into the enterprise fabric 108 and received an N_port id, the isolation switch blade 100 may perform an FDISC on behalf of all currently connected host blade N_ports and receive their virtual N_port ids in the FDISC LS_ACC. The name server of the enterprise fabric will thus be populated with the virtual N_port ids representative of the host blade 104 N_ports. A mapping of the NPV pid to the N_port pid is maintained by the isolation switch blade 100 as described below. Since the enterprise fabric 108 may not be ready to respond to the FLOGI from the isolation switch blade 100, the isolation switch blade 100 must retry the FLOGI some number of times until successful or disable the port.

The isolation switch blade 100 has to present a facade of a switch to the host blades 104 and of a host to the enterprise fabrics 108 and be able to propagate any control traffic/management requests between the blade center fabric 106 and the enterprise fabrics 108. This is described below.

Figure 7:
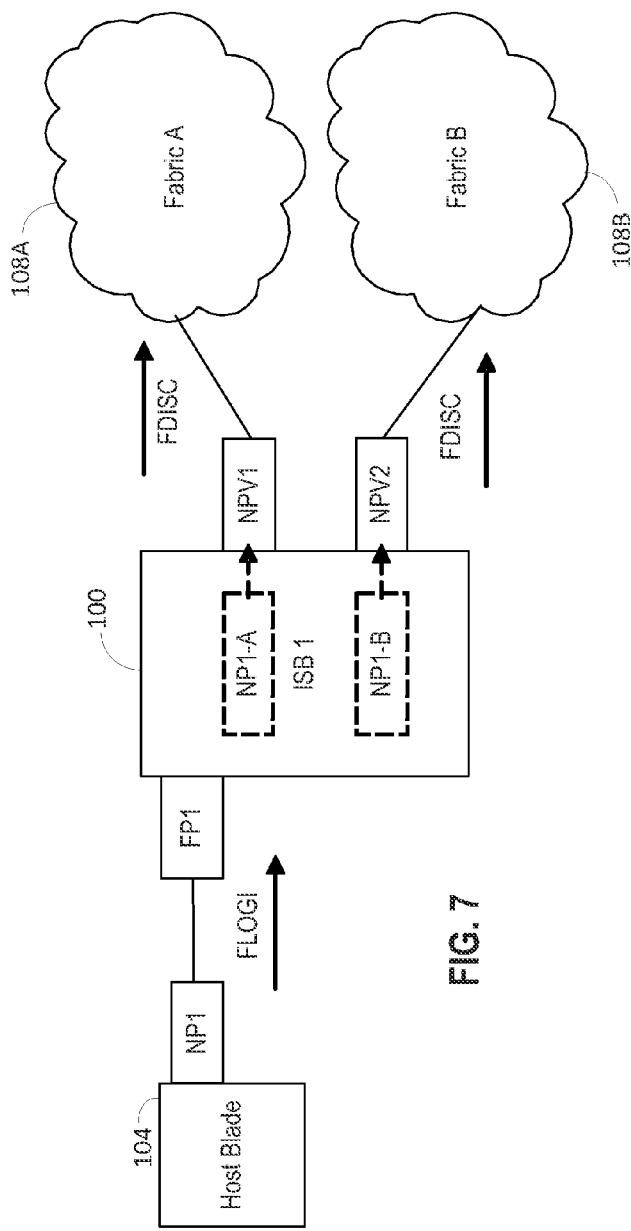
FIG. 7 depicts a fabric initialization and login procedure according to the present invention.

During the initial switch and fabric bring-up phases, a large number of activities occur simultaneously. The isolation switch blade 100 decouples the fabric bring up of the enterprise fabric 108 from the blade center fabric 106 and, as a result, the blade center fabrics 106 and enterprise 108 fabrics may be brought up in any order and independently of each other. The two bring up scenarios are described below 1. Bringing up the enterprise fabrics before the blade center fabric:

Referring now to FIG. 7, consider enterprise fabrics A and B 108A and 108B being brought up first such that these fabrics are built, zoning starts doing zone merges, and edge devices connected to these fabrics try to do FLOGI and then query the name server (NS). When an isolation switch blade 100 is connected to fabrics A and B 108A and 108B, it can now FLOGI into these fabrics. However, if the switches in fabrics A and B 108A and 108B have not completed fabric initialization at this time, the isolation switch blade 100 is connected to them (i.e. not yet obtained their domain IDs), they may disable the port on which they receive the FLOGI. Once the domain id has been assigned, they may re-enable the port. As a result, the enterprise fabrics 108 have an opportunity to quiesce before they respond to the isolation switch blade 100 FLOGIs, since the isolation switch blade 100 is attempting to connect as a device and not as a switch. Eventually, the switch may send an LS_ACC responding to the FLOGI with an N_port id for the isolation switch blade 100 port that performed the FLOGI. The isolation switch blade 100 then queries the enterprise fabric 108 name server and uses the responses to develop a name server for the blade fabric 106. Alternatively, the isolation switch blade 100 may forward the name server query from the host blade 104 to the enterprise fabric 108 and return the responses back to the host blade 104 after performing the necessary address translation of the name server response payload.

Subsequently, when a host blade 104, is plugged into the blade chassis 102 and a FLOGI is performed from N_port 1 (NP1) into the isolation switch blade 100, the isolation switch blade 100 may then send an FDISC to the enterprise fabric 108 for host blade 104 and may receive a virtual N_port id for N_port 1. In an alternate embodiment, the virtual N_port ids can be assigned a priori (i.e. before the host blade 104 is plugged in) to a given slot id so that a virtual PID is assigned before the host blade 104 is plugged into the slot. This may provide further independence between the blade fabric 106 and enterprise fabric 108 operations. However, this approach may result in unnecessary NS entries being created in the enterprise fabric 108 if the host blades 104 do not exist. Also, Port Logins (PLOGI's) to these virtual N_ports may have to be rejected in cases where the host blade 104 does not exist or the isolation switch blade 100 may have to handle these exchanges.

The host blade 104 N_port 1 may then register with the name server on the isolation switch blade 100. Once name server entries from enterprise Fabrics A and B 108A and 108B are imported into the isolation switch blade-100, N_port 1 can do a PLOGI into devices and continue with other operations as usual.

2. Bringing up the blade fabric before the enterprise fabrics:

If the isolation switch blade 100 is brought up first, it may be the principal switch and assign itself a domain id. When the host blade 104 is plugged into the blade server before fabrics A and B 108A and 108B are brought up, N_port 1 may FLOGI into F_port 1 (FP1) of the isolation switch blade 100 and register with the name server on the isolation switch blade 100. However, name server entries from enterprise fabrics 108A and 108B may not yet be available to perform FC operations to targets within the enterprise fabrics 108A and 108B. Subsequently, Fabrics A and B 108A and 108B may be brought up and the isolation switch blade 100 may perform FLOGI and FDISC to get a virtual address assignment for N_port 1 and export name server entries to the isolation switch blade 100, after which N_port 1 can PLOGI into devices and perform other operations as usual. Other host blades like host blade 104 can FLOGI into the isolation switch blade 104 while Fabrics A and B 108A and 108B are coming up.

Since the blade fabric 106 and enterprise fabric 108 are brought up independently of each other, service parameters assigned to N_ports during the fabric login process may be different. The service parameters of importance are the time out values. It is important that the isolation switch blade 100 provide the host blades 104 in the blade fabric 106 with timeout values (E_D_TOV and RA_TOV) that are equal to or less than the timeout values provided by the enterprise fabrics 108 to the virtual N_ports of the isolation switch blade 100. It is possible to enforce this if the enterprise fabrics 108 are brought up before the blade fabric 106 is brought up. However, in the case that the blade fabric 106 is brought up first, and the timeout values assigned to the host blade 104 ports happen to be higher than those assigned to the virtual N_ports by the enterprise fabric 108, the host blades 104 should be forced to log out and log into the isolation switch blade 100 again.

After receiving a LS_ACC for its FLOGI request, each host blade 104 can register for RSCN, perform a N_port login with the name server of the isolation switch blade 100 and register with the isolation switch blade's 100 name server. FCP probing may also be triggered following the FLOGI and the isolation switch blade's 100 name server may be updated. The host blades 104 may also want to query the name server database and perform N_port login with target devices in the enterprise fabric 108. In order to do this, proxy addresses for the union of name server entries within the enterprise fabrics 108 need to be assigned and the proxy addresses exposed to the host blades 104. As mentioned earlier, a mapping table may be maintained by the isolation switch blade 100. In addition to the mappings between the virtual N_port and physical N_port identifiers, mappings between the proxy addresses and enterprise addresses 108 may be maintained in the mapping table.

If the host blades 104 complete their login and registration and the isolation switch blade 100 has not yet completed the link initialization, login and FDISC to the enterprise fabrics 108, the host blades 104 may not yet be able to see the targets connected to enterprise fabrics 100 in the isolation switch blade's 100 name server. The host blade 104 may be able to subsequently PLOGI only when the targets become visible. This enables the enterprise fabric 108 build to be completed (all domains are reachable) and routes to be established before the host blades 104 start querying about or attempt to PLOGI into the devices connected to the enterprise fabric 108.

On the other hand, if the isolation switch blade 100 has already completed FLOGI and FDISC with the blade fabrics 106 and enterprise fabric 108 devices have been registered with the NS, the host blades 104 can discover devices by querying the isolation switch blade's 100 NS for the targets. This isolation between the target devices within the enterprise fabrics 108 and host blades 104 enables the enterprise fabrics 108 to be insulated from a large amount of simultaneous activity.

The addition of an additional host blade 104 into the blade chassis 102 may trigger a new FDISC to the enterprise fabric 108 and the assignment of a virtual N_port id and not a FLOGI. Since FDISC does not trigger FCP probing and NS updates, this process may be less disruptive to the enterprise fabric 108. The isolation switch blade 100 may handle FCP probing of the host blades 104 and perform NS updates to its NS database based on the probes.

In FIG. 8, PNP1-A is the virtual PID assigned for N_port 1 by Fabric A 108A and PNP1-B is the virtual PID assigned by Fabric B 108B for N_port 1. Since PNP1-A and PNP1-B are assigned by two independent fabrics, they could be identical and the mapping should be able to handle this. Similarly, the PIDs of devices in Fabric A and B 108A and 108B may collide and proxy addresses may have to be maintained to provide a unique address space that is scoped by fabric.

In order to create separate namespaces for PIDs per enterprise fabric 108 that are connected to the isolation switch blade 100, each enterprise fabric 108 is assigned a unique identifier by the isolation switch blade 100, known as the "proxy domain identifier." The proxy domain identifier may be filled into the "domain" field of the SID/DID for frames that are initiated from/targeted to switches/devices in the enterprise fabrics 108A and 108B and the remaining 16 bits of the address may be used to uniquely identify ports in each of the fabrics 108A and 108B.

Similarly, the virtual PIDs, assigned via NPV, may be used to address the isolation switch blade 100 and host blades 104 within the blade fabric 106. The isolation switch blade 100 may map these proxy and virtual addresses to physical addresses as described below.

Since the isolation switch blade 100 serves as a proxy between the blade server and enterprise fabrics 108, it has to map between virtual N_port ids assigned by the enterprise fabric 108 and N_port ids assigned by the blade fabric 106. Similarly, it has to map between the virtual proxy addresses for devices in the enterprise fabric 108 and physical addresses. These mappings may be maintained in a separate PID mapping table.

The PID mapping table contains mappings between physical and virtual host blade N_port ids and also between physical and proxy enterprise fabric 108 device N_port ids. When control or data frames from the host blade 104 are targeted to a device in the enterprise fabric 108, the SID may be mapped to the virtual N_port id at the isolation switch blade 100. The DID may be mapped from the proxy address to the physical address and sent to the right isolation switch blade 100 egress port. These mappings are performed using a PID mapping table. An exemplary PID mapping table is shown in FIG. 8. This table is used to populate the public to private and private to public address translation tables in the isolation switch blade 100 ports.

The table may be divided into sections that are indexed by the proxy domain identifier and the address of the isolation switch blade 100 virtual N_port connected to the enterprise fabrics 108. The Proxy Domain column uniquely identifies the enterprise fabric 108 to which frames from the blade fabric 106 get routed. The domain portion of the DID of all frames targeted to devices in the enterprise fabrics 108 may carry the proxy domain id. The PID mapping table partitions the PID namespace so that there is no possibility of PID conflicts. PID1, PID2 etc. are the physical addresses of ports in the enterprise fabric 108 and PID1', PID2' etc. are the corresponding proxy addresses assigned by the isolation switch blade 100.

The isolation switch blade 100 queries the NS of both Fabric A and B 108A and 108B and populates the physical addresses and the isolation switch blade 100 assigns unique logical proxy addresses pre-fixed with a proxy domain id. The isolation switch blade 100 "listens" for device detected RSCNs from these fabrics 108A and 108B and updates its mapping table. The mapping table also contains mappings between all the physical addresses (N_port 1, N_port 2 etc.) to virtual N_port id (PNP1-A, PNP2-A etc.) for N_ports of the host blades 104.

For frames destined to enterprise fabrics 108, the Proxy Domain (PD0, PD1) field in the DID is used to perform the mapping table lookup. For frames destined from enterprise fabrics 108 to host blades 104, the lookup is performed based on isolation switch blade 100 virtual N_port (NPV1, NPV2).

Host blade 104 may send a frame to a virtual target PID in Fabric A 108A from N_port 1. isolation switch blade 100 may check to see if the virtual PID is within the table partition associated with PD0 or PD1 and translate the proxy address to a physical address. Similarly, frames from the enterprise fabric 108A to the host blade 104 may be scoped by the virtual N_port (NPVI or NPV2) and the virtual N_port ids mapped to a physical N_port id from the table.

The blade server N_port (N_port 1) initiates a PLOGI to a target using the blade fabric 106 N_port id as the SID and the isolation switch blade 100 maps the SID to the virtual N_port Id of the enterprise fabric 108. Responses are directed to the virtual N_ports as DIDs and the DIDs are mapped to the blade fabric 106 N_port ids using the mappings in the PID mapping table. Similarly, the PIDs contained in the data traffic may require a wire-speed mapping of PIDs. Mapping control traffic from the host blades 104 and the enterprise fabric 108 (such as FLOGIs or PLOGIs to the NS) and traffic from the enterprise fabric 108 to the host blades 104 is mediated by the isolation switch blade 100 processor, and the mapping is implemented using a logical PID mapping table. The SID/DID used in management frames for the host blade 104 N_port may be the virtual PIDs. Some control traffic, such as certain types of ELS and NS responses, carry PIDs in their payload. In these cases the addresses in the payloads must also be mapped using the PID mapping table.

The PID mapping table entry may be updated when a PID is assigned by the blade fabric 106 to a host blade 104 N_port and updated whenever a corresponding virtual N_port id is returned by the enterprise fabric 108 in response to an FDISC (in the case of pre-provisioned virtual PIDs described earlier, a new entry may be created with the creation of a new virtual PID). Removal of a host blade 104 may cause removal of the corresponding virtual N_port id from NS and removal of the PID mapping table entry.

Only those devices in the enterprise fabric 108 that are zoned to one or more of the host blade 104 ports in the blade fabric 106 may have an entry in the blade fabric's NS and the PID mapping table. Hence the number of entries in the isolation switch blade's 100 PID mapping table may be equal to the sum of the total number of devices in the enterprise fabrics 108 that are zoned to one or more of the host blade 104 ports in the blade fabric 106 and the total number of host blades 104.

As an example, consider a frame initiated from physical address N_port 1 of the host blade 104, to target physical address PID1 in enterprise fabric A 108A. The SID/DID fields in the frame headers are:

At host blade 104: SID=N_port 1, DID=PID1'

At isolation switch blade 100: SID=PNP1-A, DID=PID1 (based on lookup indexed by proxy domain id field of DID, PD0).

In Fabric A 108: SID=PNPI-A, DID=PID1

Now consider a frame targeted to physical address N_port 1 of host blade 104 from physical address PID1 of initiator in enterprise fabric A 108A. The SID/DID fields in the frame headers are:

In Fabric A 108A: SID=PID1, DID=PNP1-A

At isolation switch blade 100: SID=PID1', DID=N_port 1 (based on lookup indexed by isolation switch blade ingress virtual N_port, NPV1).

At host blade 104: SID=PID1', DID=N_port 1

Figure 9:
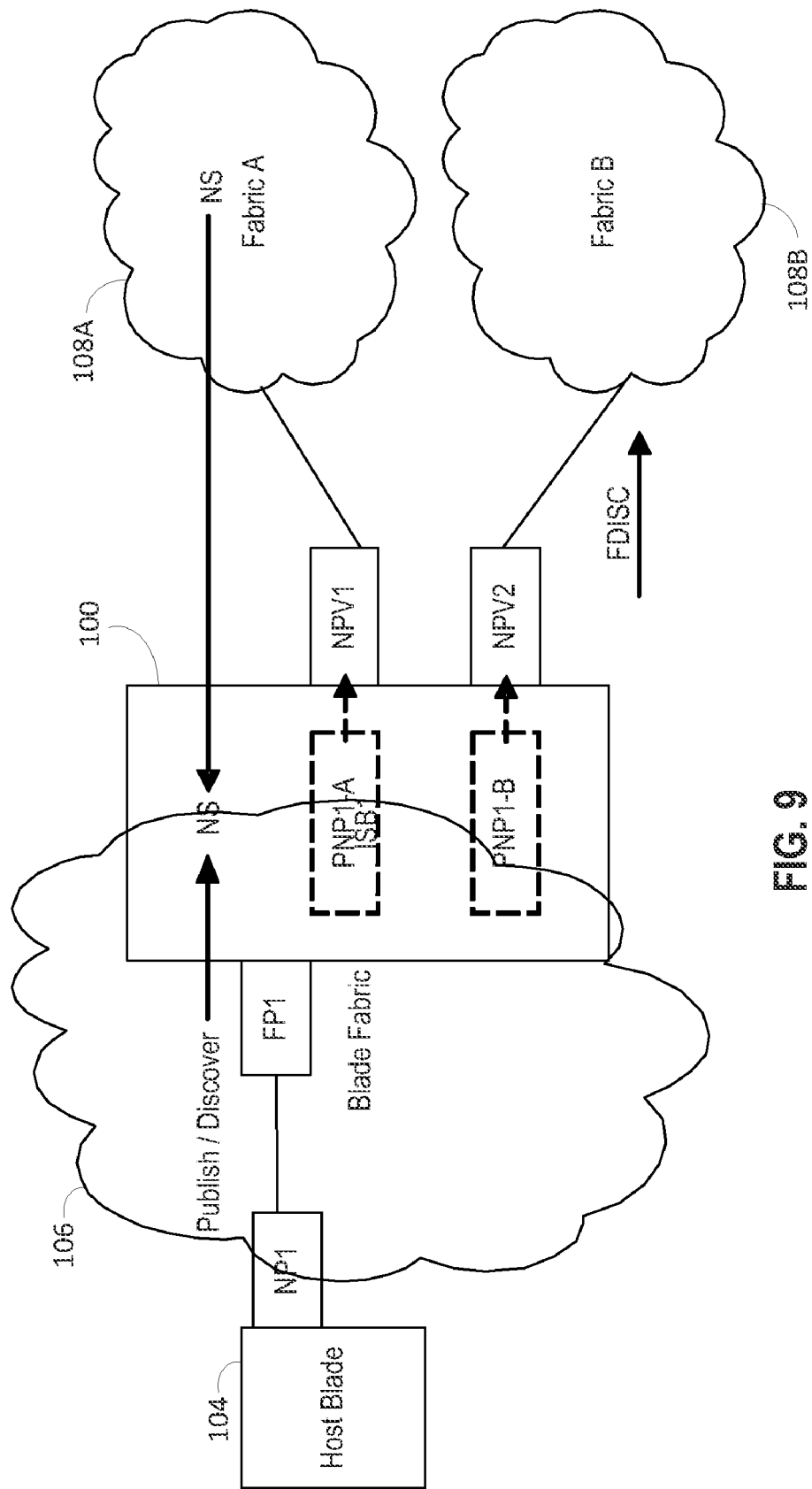
FIG. 9 depicts a device registration and discovery procedure according to the present invention.

Following the login and initialization process described above, the enterprise fabric's 108 name server may retrieve new and deleted NPV device bitmaps from the switch driver of the switch that was involved in the NPV. Since device entries for all devices in enterprise fabrics 108 are maintained in the PID mapping table, response to all host blade 104 requests may be performed by the isolation switch blade 100 and do not need to trigger queries to the NS on the enterprise fabric 108. The isolation switch blade 100 may update its own NS based on the registration and deregistration of host blades 104 and respond to any host blade 104 related NS queries. It may register for RSCNs in order to update its mapping table when devices enter and leave the enterprise fabric 108. When host blades 104 are pulled out, the NPV ports will send corresponding FLOGOs to the enterprise fabric 108 and the isolation switch blade 100 will flush the addresses of the removed host blades 104 from its name server and from its PID mapping table. Such registration and discovery is illustrated schematically in FIG. 9.

Figure 10:
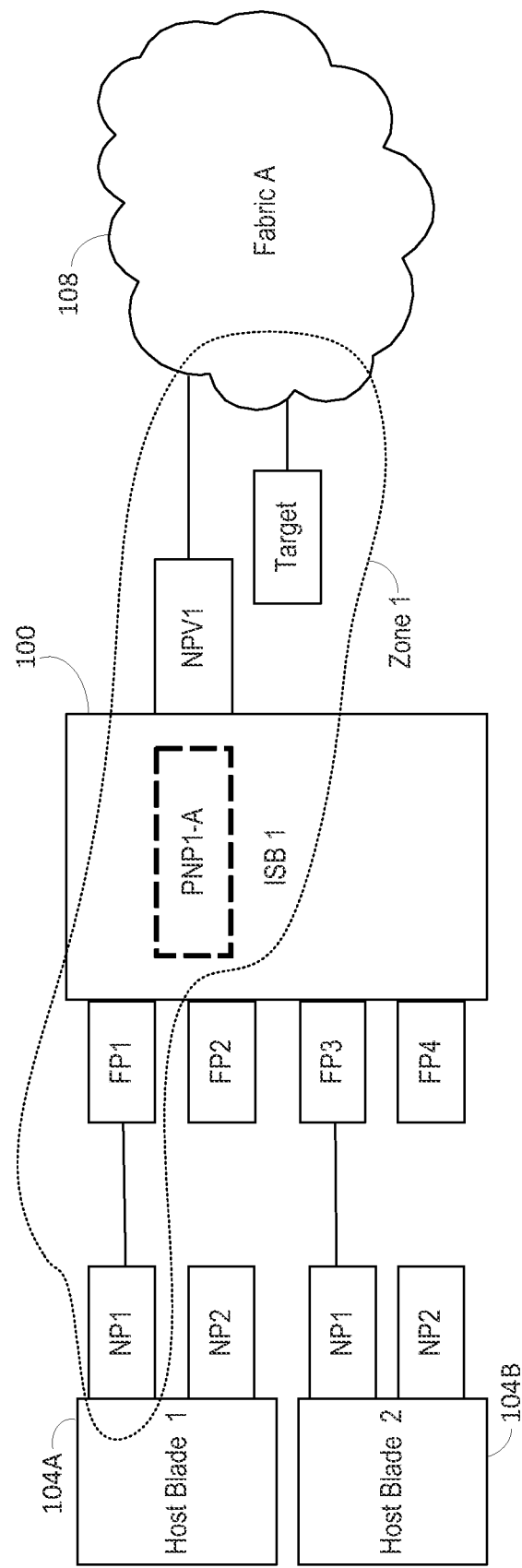
FIG. 10 depicts zoning in an enterprise fabric according to the present invention.

The isolation switch blade 100 does not impact Worldwide Named (WWN) based zoning. For domain, port based zoning, virtual N_port ids may be mapped to PIDs using the PID mapping table. To add a host blade 104 N_port to a zone, the virtual PID may be looked up in the PID mapping table and used as the PID for this port to be zoned. Such zoning is illustrated in FIG. 10 wherein host blades 104A and 104B connect to Fabric A 108 via the isolation switch blade 100.

In order to provide fault tolerance and better link utilization that can reduce the possibility of congestion, isolation switch blade 100 configurations may be able to support multiple paths from a host blade 104 to a target in the enterprise fabric 108. Depending on the capabilities of the host blade 104, it is possible to perform load balancing and/or fail over.

Figure 11:
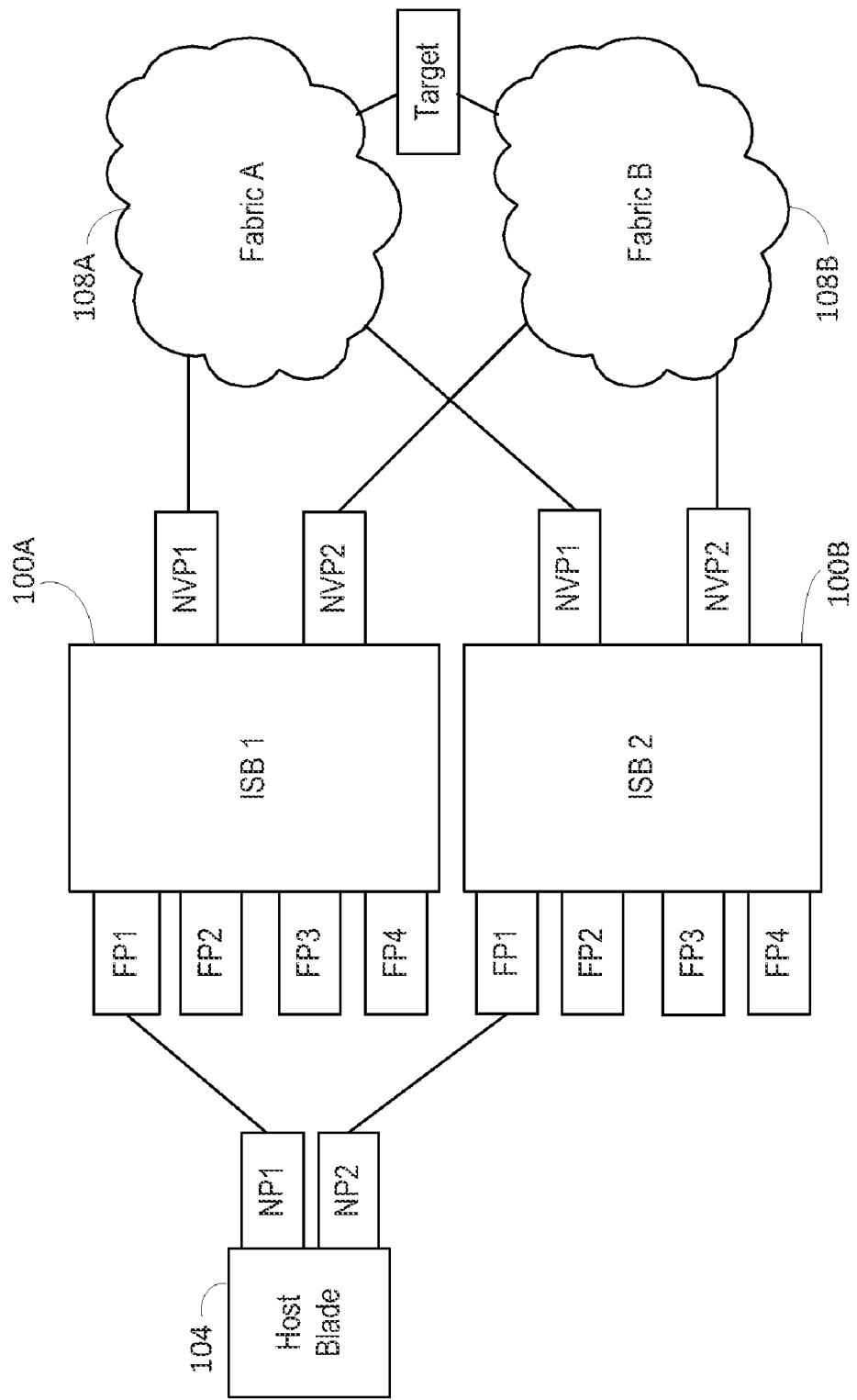
FIG. 11 shows load balancing and fail over with two isolation switch blades according to the present invention.

FIG. 11 shows a dual isolation switch blade 100 configuration. This configuration allows a host blade 104 to be connected to two fabrics A and B 108A and 108B, over separate isolation switch blades 100A and 100B. If the multipathing firmware in the host blade 104 supports load balancing, it is possible for the host blade 104 to send frames to Fabric A 108A or Fabric B 108B on both N_port 1 and N_port 2.

If the multipathing software is capable of supporting failover, the host blade 104 can send frames from N_port 2 if the path from N_port 1 to the target is not available for any reason, such as link going down or isolation switch blade 104A failing. The isolation switch blades 100A, 100B support fail over in that if isolation switch blade 100A fails, it results in isolation switch blade 100B taking over and the enterprise fabrics 108 are not subjected to disruption.

In order to support in-band fabric management, for queries via CT pass thru from the host bus adapter, management CT frames may be allowed through the isolation switch blade 100 into enterprise fabrics 108. In order to support dynamic queries to the host bus adapter using FDMI-2, CT frames from enterprise fabric 108 switches may be allowed through the host bus adapter to the host blades 104. CT frames may be directed to the isolation switch blade's 100 management server and the isolation switch blade 100 may have the same level of management capabilities as the management server on any other switch. As mentioned earlier, the isolation switch blade's 100 CPU is responsible for the address mappings of these CT frames.

In-band discovery from enterprise fabrics 108 may result in the isolation switch blade 100 being discovered as a node that is connected to that enterprise fabric 108 and hence may result in a partial view of the topology. The discovered N_port ids of the host blades 104 may be used to perform zoning.

In band discovery with the isolation switch blade 100 as a proxy may result in discovery of switches and devices in the enterprise fabrics 108 as well as the discovery of host blades 104 and may result in a complete topology discovery.

From an element management perspective, the isolation switch blade 100 should be treated as a new type of switch that exposes F_ports and N_ports. In order to enforce frame filtering at the isolation switch blade 100, the isolation switch blade 100 may be configured with access control policies.

In the NPV implementation described in above references, the SID/DID validation in the miniswitch is turned off since NPV requires a PID to be assigned by the enterprise fabric 108. Hence the DID field in the transmitted frames and the SID fields in the received frames that are expected to match at the enterprise fabric's F_port, do not match in the case of NPV. This opens up security threats since the main purpose of the SID/DID checking is to prevent spoofing of authorized devices by unauthorized devices by using the PID of the authorized device. However, since the isolation switch blade 100 is acting as an intermediary in this case, it can prevent rogue devices from spoofing since the SID/DID checking happens at the F_port of the isolation switch blade 100. Further, the security threats can be mitigated using zones of trust.

Figure 12:
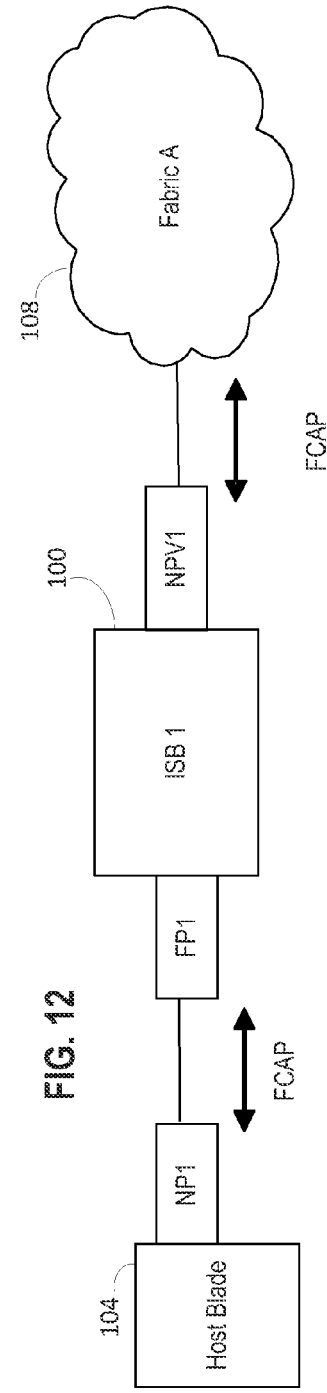
FIG. 12 shows the use of a Fibre Channel authentication protocol according to the present invention.

The FCAP protocol, as explained in U.S. patent application Ser. No. 10/062,125 filed Jan. 31, 2002 entitled "Network Security and Applications to the Fabric Environment" which is hereby incorporated by reference, is used by Secure FabOS to establish zones of trust. Host blades 104 and the isolation switch blade 100 are part of the blade fabric 106 and may be part of that fabric's zone of trust. Similarly, the isolation switch blade 100 may be part of the enterprise fabric's 108 zone of trust. FIG. 12 is a schematic representation showing FCAP between host blade 104 and the isolation switch blade 100 and between the isolation switch blade 100 and Fabric A 108.

Secure FabOS also has the notion of security policies that limit access to the fabric. One set of policies, the Device Connection Control (DCC) policies, may be used to determine which host blades 104 are allowed to connect to F_ports within the enterprise fabric 108. DCC policies may be exported from the enterprise fabrics 108 to the isolation switch blade 100 and enforced at the isolation switch blade 100.

Due to the unique placement of the isolation switch blade 100 at the edge of the enterprise fabric 108, it can further bolster the capabilities of Secure FabOS. Rules can be defined and enforced at the isolation switch blade 100 such that certain frames are filtered out and not allowed access into the enterprise fabric 108. These rules might take the form of access control policies or the form of policies that detect patterns in an attempt to differentiate legitimate traffic from intrusions.

Figure 13:
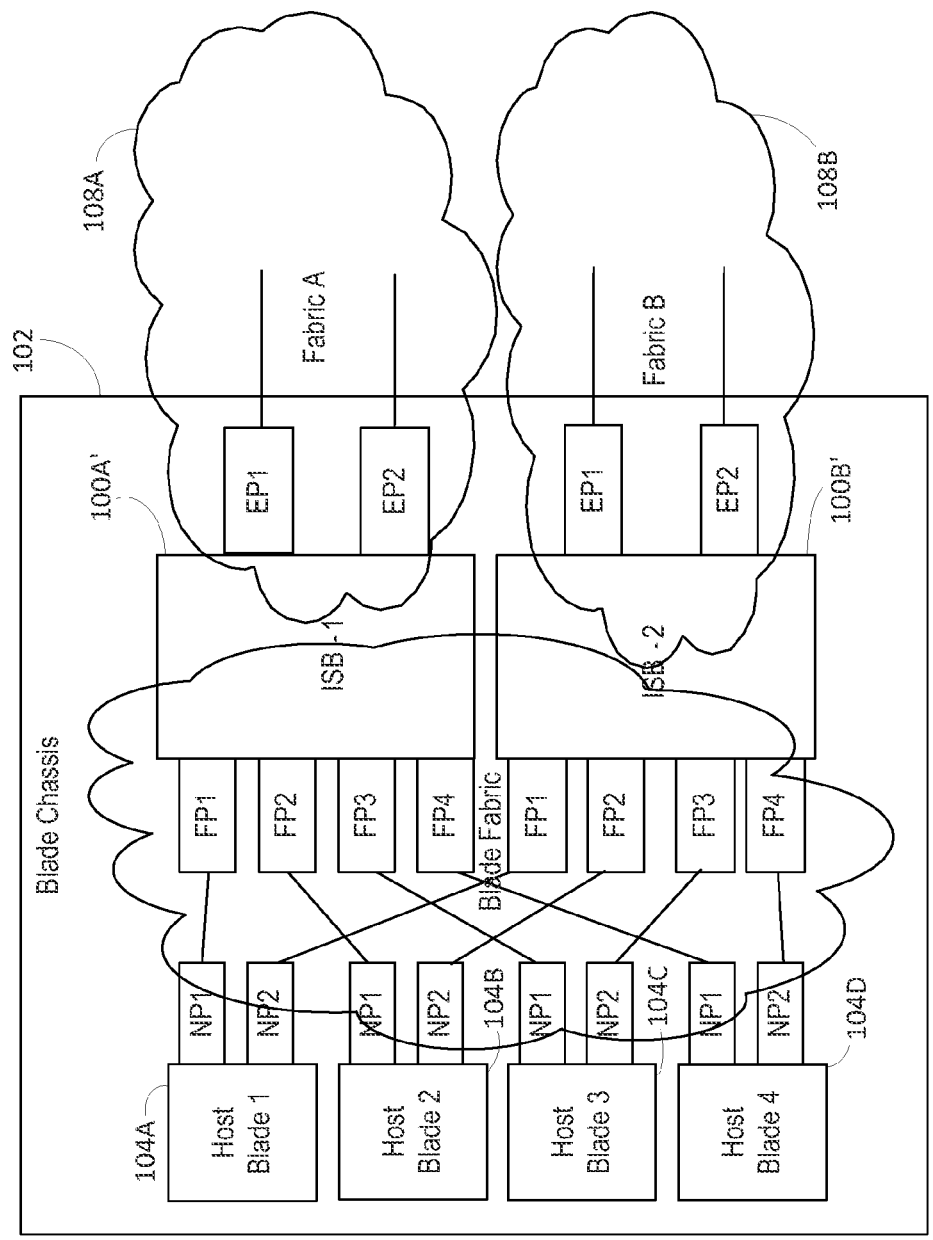
FIG. 13 shows an alternative embodiment with the connection of an isolation switch blade to an enterprise fabric as an E_Port according to the present invention.

As shown schematically in FIG. 13, another possible implementation of an isolation switch blade 100A, 100B, is to connect to the enterprise fabric 108 as an E_port. The advantage that this provides over the NPV isolation switch blade 100 is the ability to trunk E_ports. However, this configuration needs to virtualize the Fabric OS and run multiple copies as described in U.S. patent application Ser. No. 10/209,743.

Connecting as an E_port also has the disadvantage of possible lack of interoperability due to the general proprietary nature of E-ports. Because of these complexities, the potential advantages provided by trunking are generally outweighed and the preferred embodiment is as described above, though N_port trunking could provide the benefits without the disadvantages.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A computer system comprising:
    a blade chassis;
    at least one host blade located in said blade chassis, said at least one host blade including a network adapter, said network adapter having at least one node port; and
    a first data switching device located in said blade chassis, said first data switching device including:
        a plurality of blade ports, each blade port for connection to a host blade network adapter node port;
        at least one node port for connecting to a fabric; and
        a switch coupled to said plurality of blade ports and said at least one node port for interconnecting said ports.

2. The computer system of claim 1, wherein said first data switching device said at least one node port operates as a virtual node port, with one virtual node address for each of said plurality of blade ports connected to host blade network adapter network ports.

3. The computer system of claim 1, wherein said plurality of blade ports form a second fabric.

4. The computer system of claim 1, wherein each host blade network adapter has two node ports, and further comprising:
    a second data switching device located in said blade chassis, said second data switching device including:
        a plurality of blade ports, each blade port for connection to a host blade network adapter node port;
        at least one node port for connecting to a fabric; and
        a switch coupled to said plurality of blade ports and said at least one node port for interconnecting said ports,
    wherein a blade port from said first data switching device is connected to a first of said two host blade network adapter node ports and a blade port from said second data switching device is connected to a second of said two host blade network adapter node ports.

5. The computer system of claim 4, wherein said first and second data switching devices each have two node ports, and
    wherein a first node port from said first data switching device and from said second data switching device are connected to a first fabric and a second node port from said first data switching device and from said second data switching device are connected to a second fabric.

6. The computer system of claim 5, wherein both said first and second data switching device node ports operate as virtual node ports, with one virtual node address for each of said plurality of blade ports connected to host blade Fibre Channel adapter Fibre Channel ports.

7. The computer system of claim 4, wherein said first and second data switching devices each have two node ports, and
    wherein both node ports from said first data switching device are connected to a first fabric and both node ports from said from said second data switching device are connected to a second fabric.

8. The computer system of claim 7, wherein both said first and second data switching device node ports operate as virtual node ports, with one virtual node address for each of said plurality of blade ports connected to host blade network adapter node ports.

9. A computer system comprising:
    a blade chassis;
    at least one host blade located in said blade chassis, said at least one host blade including a Fibre Channel adapter, said Fibre Channel adapter having at least one Fibre Channel N_port; and
    a first data switching device located in said blade chassis, said first data switching device including:
        a plurality of blade ports, each blade port for connection to a host blade Fibre Channel adapter Fibre Channel N_port;
        at least one N_port for connecting to a Fibre Channel fabric; and
        a switch coupled to said plurality of blade ports and said at least one N_port for interconnecting said ports.

10. The computer system of claim 9, wherein said first data switching device said at least one N_port operates as a virtual N_port, with one virtual N_port address for each of said plurality of blade ports connected to host blade Fibre Channel adapter Fibre Channel N_ports.

11. The computer system of claim 9, wherein said plurality of blade ports form a second fabric.

12. The computer system of claim 9, wherein each host blade Fibre Channel adapter has two Fibre Channel N_ports, and further comprising:
    a second data switching device located in said blade chassis, said second data switching device including:
        a plurality of blade ports, each blade port for connection to a host blade Fibre Channel adapter Fibre Channel N_port;
        at least one N_port for connecting to a Fibre Channel fabric; and
        a switch coupled to said plurality of blade ports and said at least one N_port for interconnecting said ports,
    wherein a blade port from said first data switching device is connected to a first of said two host blade Fibre Channel adapter Fibre Channel N_ports and a blade port from said second data switching device is connected to a second of said two host blade Fibre Channel adapter Fibre Channel N_ports.

13. The computer system of claim 12, wherein said first and second data switching devices each have two N_ports, and
    wherein a first N_port from said first data switching device and from said second data switching device are connected to a first Fibre Channel fabric and a second N_port from said first data switching device and from said second data switching device are connected to a second Fibre Channel fabric.

14. The computer system of claim 13, wherein both said first and second data switching device N_ports operate as virtual N_ports, with one virtual N_port address for each of said plurality of blade ports connected to host blade Fibre Channel adapter Fibre Channel ports.

15. The computer system of claim 12, wherein said first and second data switching devices each have two N_ports, and
    wherein both N_ports from said first data switching device are connected to a first Fibre Channel fabric and both N_ports from said from said second data switching device are connected to a second Fiber Channel fabric.

16. The computer system of claim 15, wherein both said first and second data switching device N_ports operate as virtual N_ports, with one virtual N_port address for each of said plurality of blade ports connected to host blade Fibre Channel adapter Fibre Channel ports.

17. A network comprising:
a first Fibre Channel fabric;
at least one storage device connected to said Fibre Channel fabric;
a computer system including:
  a blade chassis;
  at least one host blade located in said blade chassis, said at least one host blade including a Fibre Channel adapter, said Fibre Channel adapter having at least one Fibre Channel port; and
  a first data switching device located in said blade chassis, said first data switching device including:
    a plurality of blade ports, each blade port for connection to a host blade Fibre Channel adapter Fibre Channel port;
    at least one N_port for connecting to a Fibre Channel fabric; and
    a switch coupled to said plurality of blade ports and said at least one N_port for interconnecting said ports.

18. The network of claim 17, wherein said at least one node port operates as a virtual N_port, with one virtual node address for each of said plurality of blade ports connected to host blade Fibre Channel adapter Fibre Channel ports.

19. The network of claim 17, wherein said plurality of blade ports form a second fabric.

20. The network of claim 17, wherein each host blade Fibre Channel adapter has two Fibre Channel ports,
wherein said computer system further includes:
  a second data switching device located in said blade chassis, said second data switching device including:
    a plurality of blade ports, each blade port for connection to a host blade Fibre Channel adapter Fibre Channel port;
    at least one N_port for connecting to a Fibre Channel fabric; and
    a switch coupled to said plurality of blade ports and said at least one N_port for interconnecting said ports, and
wherein a blade port from said first data switching device is connected to a first of said two host blade Fibre Channel adapter Fibre Channel ports and a blade port from said second data switching device is connected to a second of said two host blade Fibre Channel adapter Fibre Channel ports.

21. The network of claim 20, further comprising:
a second Fibre Channel fabric;
wherein said first and second data switching devices each have two N_ports, and
wherein a first N_port from said first data switching device and from said second data switching device are connected to said first Fibre Channel fabric and a second N_port from said first data switching device and from said second data switching device are connected to said second Fibre Channel fabric.

22. The network of claim 21, wherein both N_ports operate as virtual N_ports, with one virtual node address for each of said plurality of blade ports connected to host blade Fibre Channel adapter Fibre Channel ports.

23. The network of claim 20, wherein said first and second data switching devices each have two N_ports, and
wherein both N_ports from said first data switching device are connected to said first Fibre Channel fabric and both N_ports from said from said second data switching device are connected to said second Fibre Channel fabric.

24. The network of claim 23, wherein both N_ports operate as virtual N_ports, with one virtual node address for each of said plurality of blade ports connected to host blade Fibre Channel adapter Fibre Channel ports.

* * * * *